(12) United States Patent
Kvarnström et al.

(10) Patent No.: US 10,495,211 B2
(45) Date of Patent: Dec. 3, 2019

(54) SHIFTER ASSEMBLY HAVING A PIVOT MECHANISM

(71) Applicant: KONGSBERG AUTOMOTIVE AB, Mullsjö (SE)

(72) Inventors: Anders Kvarnström, Jönköping (SE); Bengt Cyrén, Svanesund (SE)

(73) Assignee: Kongsberg Automotive AB, Mullsjö (SE)

( * ) Notice: Subject to any disclaimer, the term of this patent is extended or adjusted under 35 U.S.C. 154(b) by 920 days.

(21) Appl. No.: 14/917,061

(22) PCT Filed: Sep. 8, 2014

(86) PCT No.: PCT/IB2014/064322
§ 371 (c)(1),
(2) Date: Mar. 7, 2016

(87) PCT Pub. No.: WO2015/033322
PCT Pub. Date: Mar. 12, 2015

(65) Prior Publication Data
US 2016/0215874 A1    Jul. 28, 2016

Related U.S. Application Data

(60) Provisional application No. 61/874,598, filed on Sep. 6, 2013.

(51) Int. Cl.
*F16H 59/02* (2006.01)
*F16H 59/04* (2006.01)
*F16H 59/10* (2006.01)

(52) U.S. Cl.
CPC ......... *F16H 59/0204* (2013.01); *F16H 59/04* (2013.01); *F16H 59/044* (2013.01);
(Continued)

(58) Field of Classification Search
CPC ...... F16H 59/0204; F16H 59/04; F16H 59/10; F16H 2059/0273; G05G 2009/04718
(Continued)

(56) References Cited

U.S. PATENT DOCUMENTS

| 2,939,332 A | 6/1960 | Peterson |
| 3,602,060 A | 8/1971 | Magg |

(Continued)

FOREIGN PATENT DOCUMENTS

| EP | 1363047 B1 | 11/2003 |
| EP | 1736846 A1 | 12/2006 |

(Continued)

OTHER PUBLICATIONS

International Search Report and Written Opinion for PCT/IB2014/064322 dated May 27, 2015, 15 pages.

(Continued)

*Primary Examiner* — William C Joyce
(74) *Attorney, Agent, or Firm* — Howard & Howard Attorneys PLLC

(57) ABSTRACT

A shifter assembly including a shift lever pivotally mounted to a housing, a shift lever, a first pivot mechanism, a gimbal ring, and a second pivot mechanism. The lever is movable in a first gate along a first plurality of paths, a second gate along a second plurality of paths, and a bridge gate between the first and second gates. The first pivot mechanism is mounted to the lever to permit movement about a first pivot axis within one of the gates. The gimbal has an aperture and is disposed about and coupled to the lever. The second pivot mechanism is mounted to the gimbal to permit movement about a second pivot axis within another one of the gates. The axes are spaced from each other. The gimbal has (Continued)

receivers recessed from the inner surface with the first pivot mechanism engaging the receivers to couple the lever to the gimbal.

25 Claims, 25 Drawing Sheets

(52) U.S. Cl.
CPC .......... *F16H 59/10* (2013.01); *F16H 59/105* (2013.01); *F16H 2059/026* (2013.01); *F16H 2059/0273* (2013.01)

(58) Field of Classification Search
USPC ..................... 74/473.18, 473.33, 471 XY
See application file for complete search history.

(56) References Cited

U.S. PATENT DOCUMENTS

| | | | |
|---|---|---|---|
| 4,328,712 A | 5/1982 | Osborn | |
| 4,519,266 A * | 5/1985 | Reinecke | F16H 59/044 116/DIG. 20 |
| 4,646,582 A * | 3/1987 | Kijima | F16H 59/044 74/473.11 |
| 4,912,997 A | 4/1990 | Malcolm et al. | |
| 5,029,488 A * | 7/1991 | Buhl | B60K 20/02 74/473.36 |
| 5,313,853 A * | 5/1994 | Olmsted | B60K 20/02 267/150 |
| 5,493,931 A | 2/1996 | Niskanen | |
| 5,852,953 A | 12/1998 | Ersoy | |
| 5,950,493 A | 9/1999 | Pritchard | |
| 6,064,369 A * | 5/2000 | Okabe | G05G 5/06 200/6 A |
| 6,448,670 B1 | 9/2002 | Onodera et al. | |
| 6,467,965 B1 * | 10/2002 | Wyer | F16C 33/08 384/295 |
| 6,848,332 B2 | 2/2005 | Hayashi et al. | |
| 7,137,475 B2 | 11/2006 | Shiomi et al. | |
| 7,421,923 B2 | 9/2008 | Kim | |
| 7,472,621 B2 | 1/2009 | Syamoto et al. | |
| 7,552,659 B2 | 6/2009 | Komatsu et al. | |
| 7,726,215 B2 | 6/2010 | Giefer et al. | |
| 7,750,624 B2 | 7/2010 | Heo et al. | |
| 7,854,179 B2 * | 12/2010 | Shimizu | F16H 59/02 74/473.1 |
| 8,720,293 B2 * | 5/2014 | Kato | F16H 59/0204 74/471 XY |
| 2004/0216549 A1 | 11/2004 | Shiomi et al. | |
| 2006/0213304 A1 * | 9/2006 | Takikawa | F16H 59/10 74/473.3 |
| 2007/0034041 A1 | 2/2007 | Dominguis Botella et al. | |
| 2009/0223318 A1 | 9/2009 | Ballard | |
| 2010/0242656 A1 * | 9/2010 | Kino | F16H 59/10 74/473.12 |
| 2010/0294067 A1 | 11/2010 | Bak et al. | |
| 2013/0105634 A1 | 5/2013 | DeCraene et al. | |
| 2013/0318080 A1 | 8/2013 | Persson et al. | |
| 2014/0165768 A1 * | 6/2014 | Fontana | F16H 59/04 74/473.33 |

FOREIGN PATENT DOCUMENTS

| | | |
|---|---|---|
| EP | 2581629 A1 | 4/2013 |
| EP | 2728224 A1 | 5/2014 |
| GB | 2070159 A | 9/1981 |
| JP | 2007045390 A | 2/2007 |
| JP | 2011105166 A | 6/2011 |
| WO | WO 2013076517 A1 | 5/2013 |
| WO | WO 2015033320 A2 | 3/2015 |
| WO | WO 2015033322 A2 | 3/2015 |

OTHER PUBLICATIONS

English language abstract and computer-generated translation for JP2007045390 extracted from espacenet.com database dated Oct. 14, 2016, 18 pages.

English language abstract and computer-generated translation for JP2011105166 extracted from espacenet.com database dated Oct. 14, 2016, 12 pages.

English language abstract and computer-generated translation for EP1736846 extracted from espacenet.com database dated Oct. 14, 2016, 12 pages.

* cited by examiner

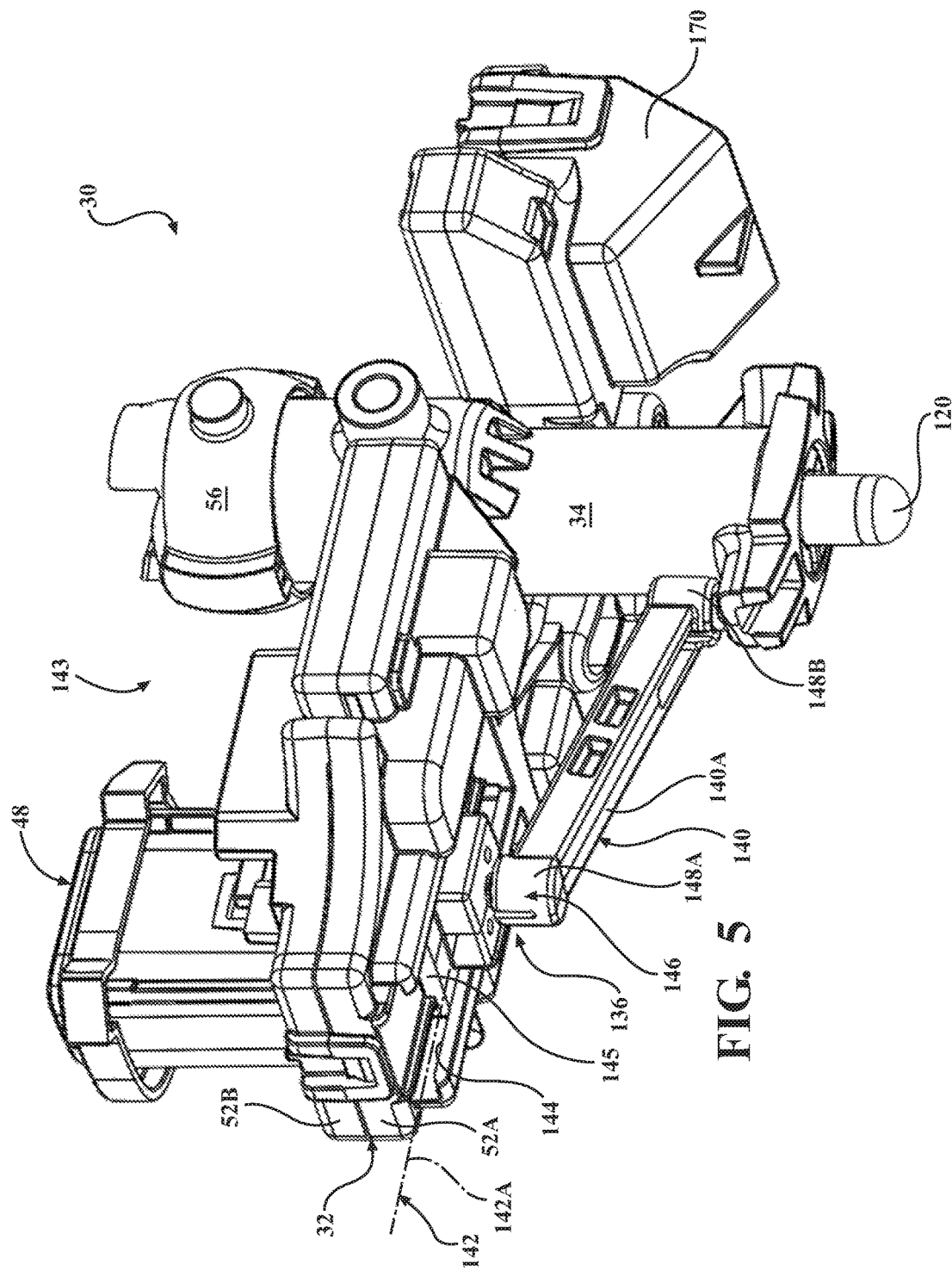

SHIFTER ASSEMBLY HAVING A PIVOT MECHANISM

CROSS-REFERENCE TO RELATED APPLICATIONS

The subject patent application is the National Stage of International Patent Application No. PCT/IB2014/064322, filed on Sep. 8, 2014, which claims priority to and all the benefits of U.S. Provisional Patent Application Ser. No. 61/874,598, which was filed on Sep. 6, 2013, the disclosures of which are hereby incorporated by reference.

BACKGROUND OF THE INVENTION

1. Field of the Invention

The present invention relates generally automotive shifter systems, and, more specifically, to a shifter assembly having a pivot mechanism.

2. Description of the Related Art

Conventional automotive powertrain systems known in the art typically include an engine in rotational communication with a transmission. The engine generates rotational torque which is selectively translated to the transmission which, in turn, translates rotational torque to one or more wheels. Typically, the transmission multiplies the rotational speed and torque generated by the engine through a series of predetermined gear sets, whereby changing between gear sets enables a vehicle to travel at different vehicle speeds for a given engine speed. Thus, the gear sets of the transmission are configured such that the engine can operate at particularly desirable rotational speeds so as to optimize performance and efficiency.

There are a number of different types of automotive transmissions known in the art. For example, so-called "manual" transmission systems include a clutch disposed between the engine and transmission for modulating engagement therebetween, and a shifter assembly for changing between gear sets. The clutch and shifter assembly are both mechanically connected to the manual transmission and are driver-actuated. Conventional "automatic" transmission systems, on the other hand, require substantially less driver input, whereby a hydraulic torque converter replaces the clutch, and changing between gear sets is achieved electronically through solenoids controlled by a transmission controller. However, because automatic transmission systems can change between gear sets without driver interaction, a shifter assembly is typically provided for operating the automatic transmission in different modes, such as "park," "neutral," "reverse," and/or "drive."

When compared to conventional manual transmission systems, conventional automatic transmission systems were inefficient, shifted slowly, and responded poorly. However, modern automatic transmission systems have improved significantly in recent years and are now capable of performance that exceeds that of conventional manual transmission systems. By way of example, modern automatic transmission systems may omit a torque converter and/or may include one or more electronically and/or hydraulically actuated clutches (sometimes referred to in the art as a "dual clutch automatic transmission) that can be shifted electronically and, thus, quickly. Similarly, conventional manual transmissions may be automated, whereby electronic actuators are used to shift between gear sets and modulate the clutch without operator interaction.

Given the trend in the art of utilizing electronic actuators to control transmission systems, modern shifter assemblies may be "drive-by-wire" and control the transmission electronically, as opposed to conventional shifter assemblies that utilize cables. As such, and particularly with respect to high-end performance vehicles, there is a trend in the art of utilizing "manual-shift" or "sport" modes, whereby the driver is able to quickly shift the automatic transmission between gear sets, as well as between operating modes, as noted above. To that end, the driver operates one or more electronic actuators in communication with the transmission controller to engage "manual-shift" mode and subsequently control the solenoids to selectively "shift up" or "shift down" between gear sets. Actuators of this type are implemented as one or more buttons and/or levers mounted to or near the shifter assembly and/or a steering wheel. The actuator used to engage "manual-shift" mode is spaced from the actuator or actuators used to change between gear sets, thereby complicating the functionality, usability, and ergonomics of the shifter assembly, as well as the cost and complexity of manufacturing and assembling the shifter assembly.

While shifter assemblies known in the prior art have generally performed well for their intended purpose, there remains a need in the art for an improved shifter assembly that strikes a substantial balance between cost, manufacturability, functionality, usability, and ergonomics.

SUMMARY OF THE INVENTION AND ADVANTAGES

The present invention overcomes the disadvantages in the related art in a shifter assembly for changing gears in a vehicle transmission. The shifter assembly includes a housing, a shift lever, a first pivot mechanism, a gimbal ring, and a second pivot mechanism. The shift lever is pivotally mounted to the housing and is movable in a first gate along a first plurality of shift paths, a second gate along a second plurality of shift paths, and a bridge gate between the first and second gates with the gates being different from each other. The first pivot mechanism is mounted to the shift lever to permit movement of the shift lever relative to the housing about a first pivot axis within one of the gates. The gimbal ring has an outer surface and an inner surface defining an aperture with the gimbal ring disposed about and coupled to the shift lever with the shift lever extending through the aperture. The second pivot mechanism is mounted to the gimbal ring to permit movement of the shift lever relative to the housing about a second pivot axis within another one of the gates, the second pivot axis being spaced from the first pivot axis. The gimbal ring has a pair of pivot receivers recessed from the inner surface and spaced from the outer surface with the first pivot mechanism of the shift lever engaging each of the pivot receivers to pivotally couple the shift lever to the gimbal ring.

In this way, the shifter assembly of the present invention provides improved functionality, usability, and ergonomics in connection with conventional automatic transmission systems and, at the same time, reduces the cost and complexity of manufacturing and assembling shifter assemblies.

BRIEF DESCRIPTION OF THE DRAWINGS

Other advantages of the present invention will be readily appreciated, as the same becomes better understood by reference to the following detailed description when considered in connection with the accompanying drawings.

FIG. 5 is another perspective view of the shifter subassembly and housing inner elements of FIG. 4.

DETAILED DESCRIPTION OF THE INVENTION

Figure 1:
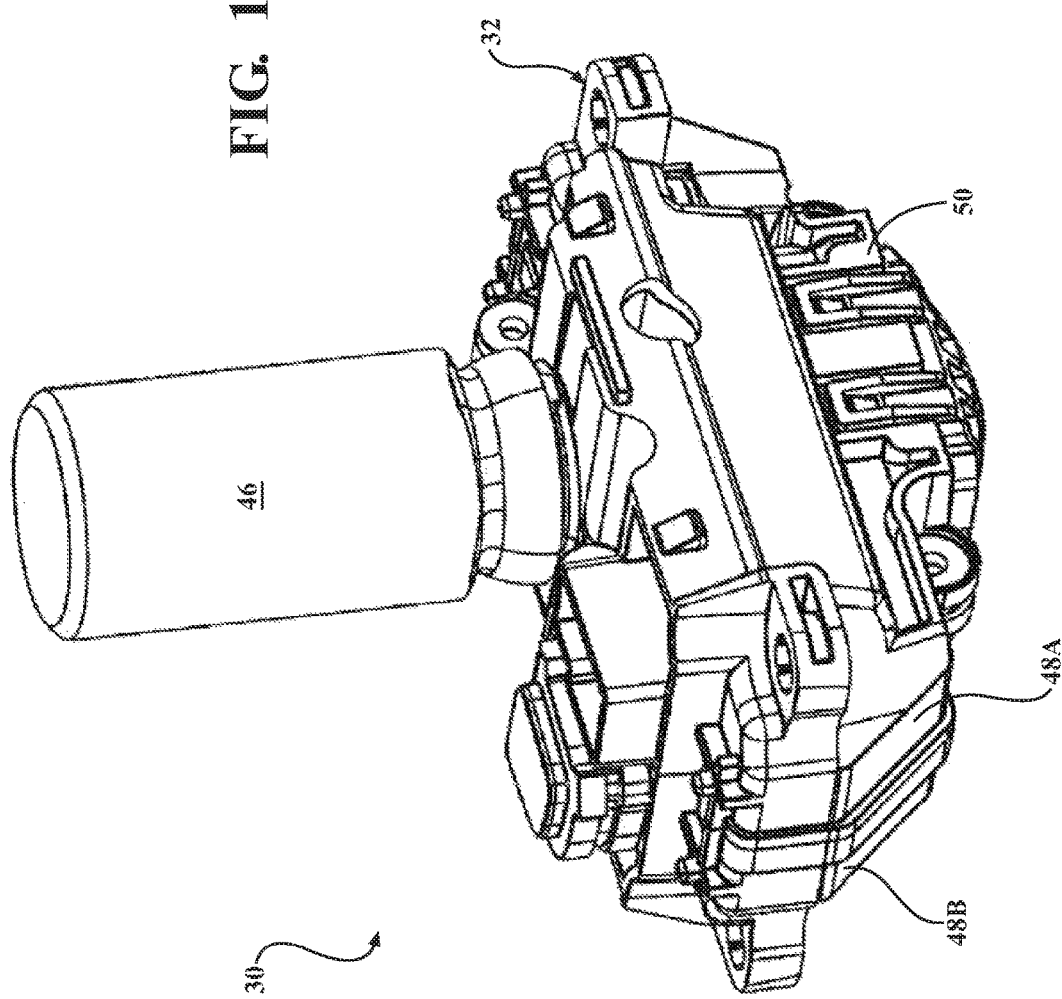
FIG. 1 is a perspective view of a shifter assembly according to one embodiment of the present invention.
Figure 2:
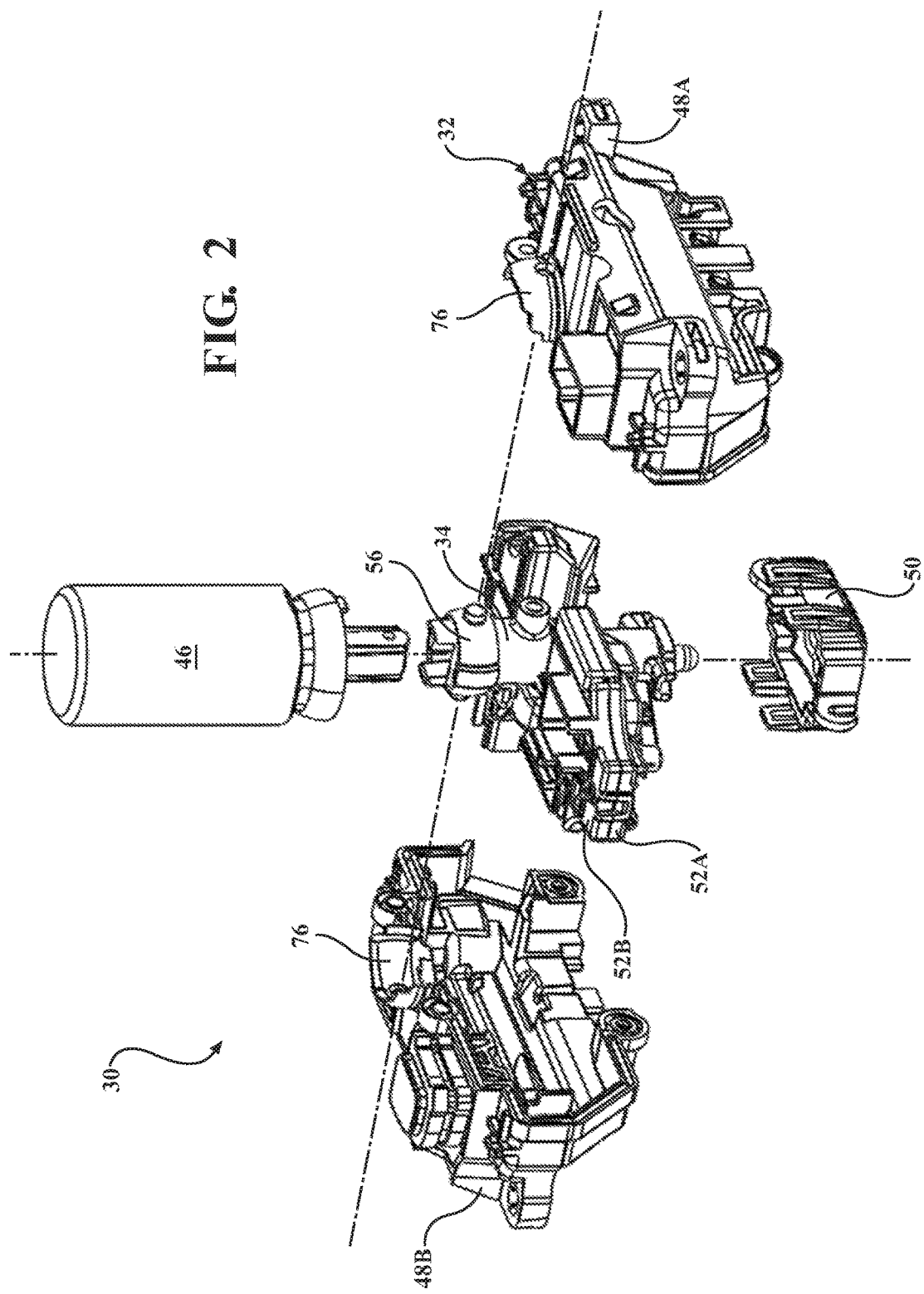
FIG. 2 is an exploded perspective view of the shifter assembly of FIG. 1, showing a housing inner element, a shifter subassembly, a pair of housing side elements, a lower housing element, and a shift knob.
Figure 3:
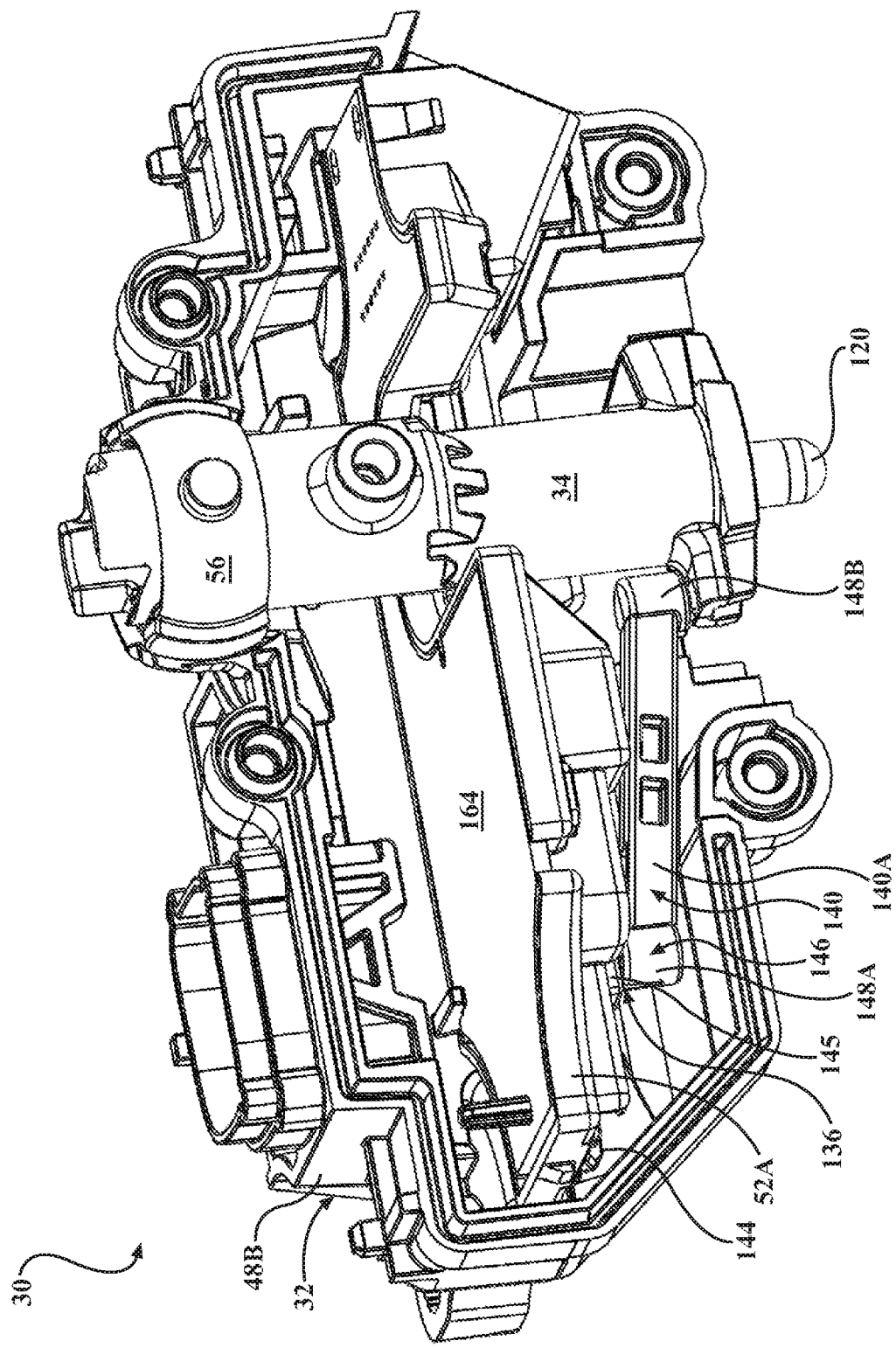
FIG. 3 is a perspective view of the shifter subassembly, one of the housing side elements, and a portion of the housing inner element of FIG. 2.
Figure 4:
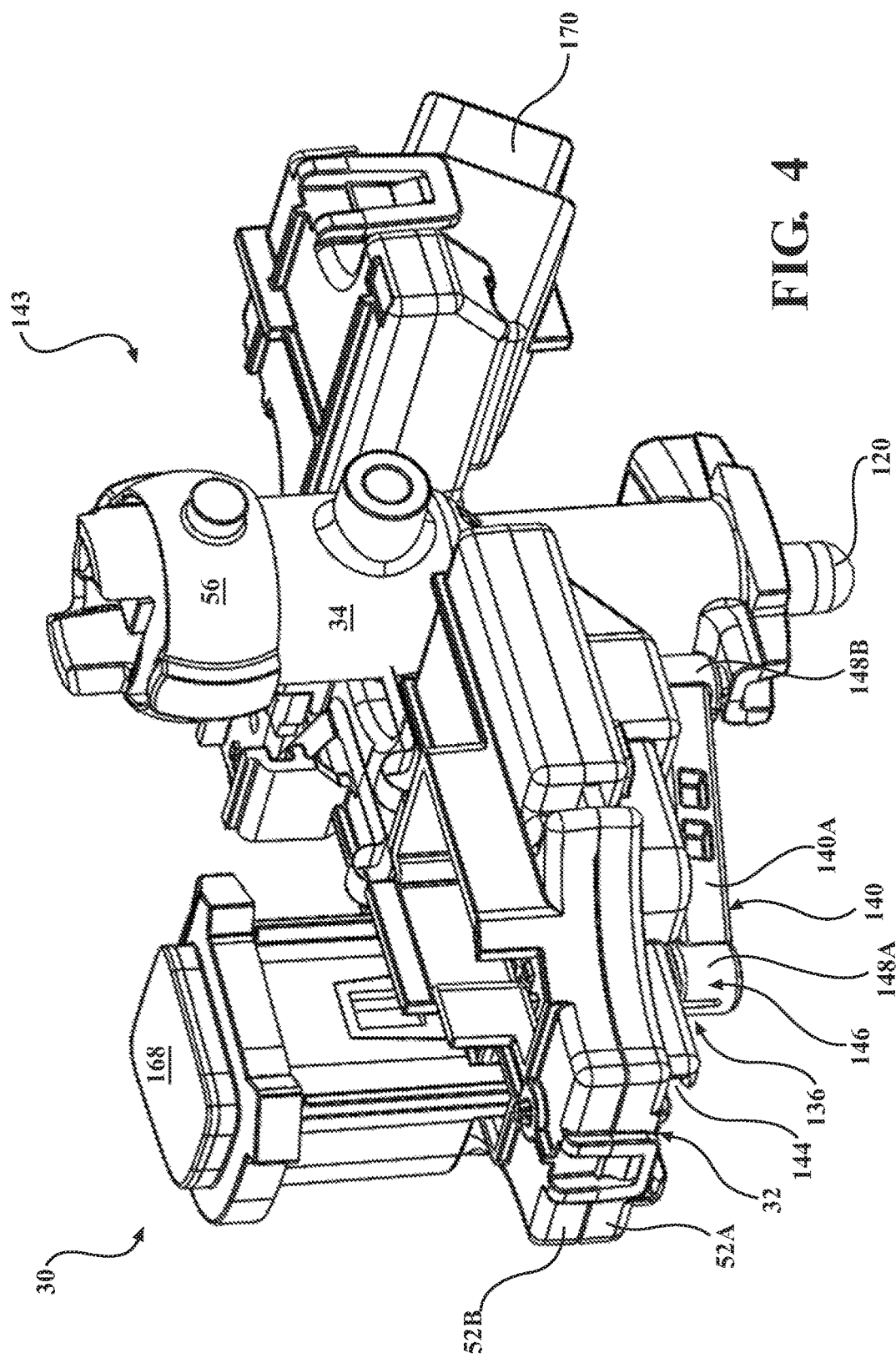
FIG. 4 is a perspective view of the shifter subassembly and housing inner elements of FIGS. 2 and 3.

With reference now to the Figures, wherein like numerals indicate like parts throughout the several views, a shifter assembly is shown at 30 in FIGS. 1 and 2. The shifter assembly 30 is used to change gears in a vehicle transmission 31. More specifically, the shifter assembly 30 cooperates with an automatic transmission 31 (shown schematically and generally known in the art) of a vehicle so as to enable a driver to operate the transmission 31 in a plurality of vehicle driving modes, such as "park," "neutral," "reverse," and "drive," as well as between a plurality of predetermined transmission gear sets, whereby the driver can selectively "shift up" and "shift down" to change between gear sets. To that end, the shifter assembly 30 is in electrical communication with one or more electronic control units 33, such as an engine or transmission controller 33 (shown schematically and generally known in the art) which, in turn, is responsive to predetermined signals generated by the shifter assembly 30 and can subsequently control the automatic transmission 31 as required. The electronic control unit 33 drives one or more actuators, such as solenoids (not shown, but generally known in the art) to control the transmission 31. However, those having ordinary skill in the art will appreciate that the shifter assembly 30 of the present invention could be used in connection with an automatic transmission controlled in any suitable way, with or without an electronic control unit 33 or actuators as described above, without departing from the scope of the present invention. Moreover, it will be appreciated that the shifter assembly 30 of the present invention can be used in connection with any suitable type of transmission. By way of non-limiting example, the transmission could be a conventional automatic that employs a torque converter, a modern automatic that employs one or more electronically and/or hydraulically actuated clutches, or a conventional manual with an automatically actuated clutch.

Figure 26:
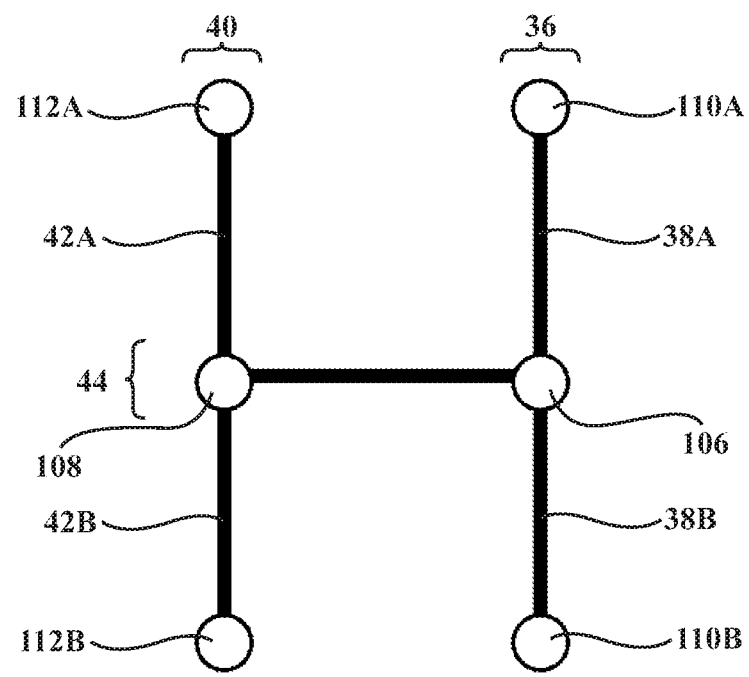
FIG. 26 is a schematic representation of movement of the shifter assembly according to one embodiment of the present invention.

Referring now to FIGS. 1, 2, and 26, the shifter assembly 30 of the present invention includes a housing 32 and a shift lever 34 pivotally mounted to the housing 32. The shift lever 34 is movable in a first gate 36 along a first plurality of shift paths 38A, 38B, as well as in a second gate 40 along a second plurality of shift paths 42A, 42B. The first gate 36 is different from the second gate 40. Moreover, the shifter assembly 30 is configured such that the shift lever 34 is movable along a bridge gate 44 between the first gate 36 and second gate 40, with the bridge gate 44 being different than the first gate 36 and the second gate 40. More specifically, movement of the shift lever 34 along the gates 36, 40, 44 is effected by movement of a shift knob 46 operatively attached to the shift lever 34, whereby the driver moves the shift knob 46 which, in turn, moves the shift lever 34, as described above. The housing 32, shift lever 34, gates 36, 40, 44, and shift paths 38A, 38B, 42A, 42B will be described in greater detail below.

As shown best in FIG. 2, the housing 32 may be formed from a plurality of elements that interlock or otherwise cooperate to accommodate and support the various components of the shifter assembly 30, as described in greater detail below. As illustrated throughout the Figures, the housing 32 includes a pair of side elements 48A, 48B, a lower element 50, and a pair of inner elements 52A, 52B. This configuration simplifies both the manufacturing and assembly of the shifter assembly 30 and optimizes the overall packaging size of the shifter assembly 30. However, it will be appreciated that the housing 32 could be formed from any suitable number of elements, or from a single element, without departing from the scope of the present invention.

Figure 13:
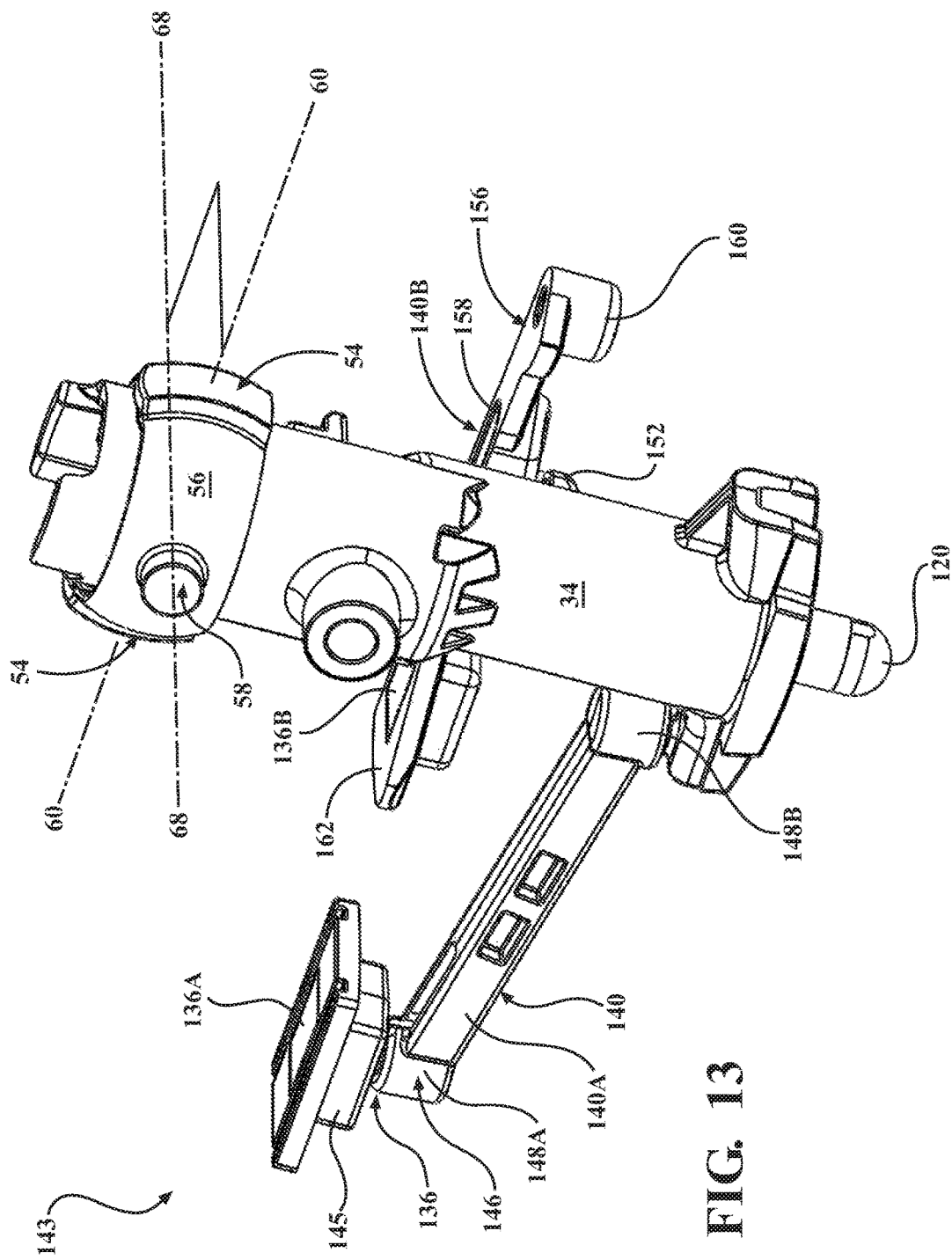
FIG. 13 is a perspective view of the shifter subassembly of FIG. 6A.
Figure 14:
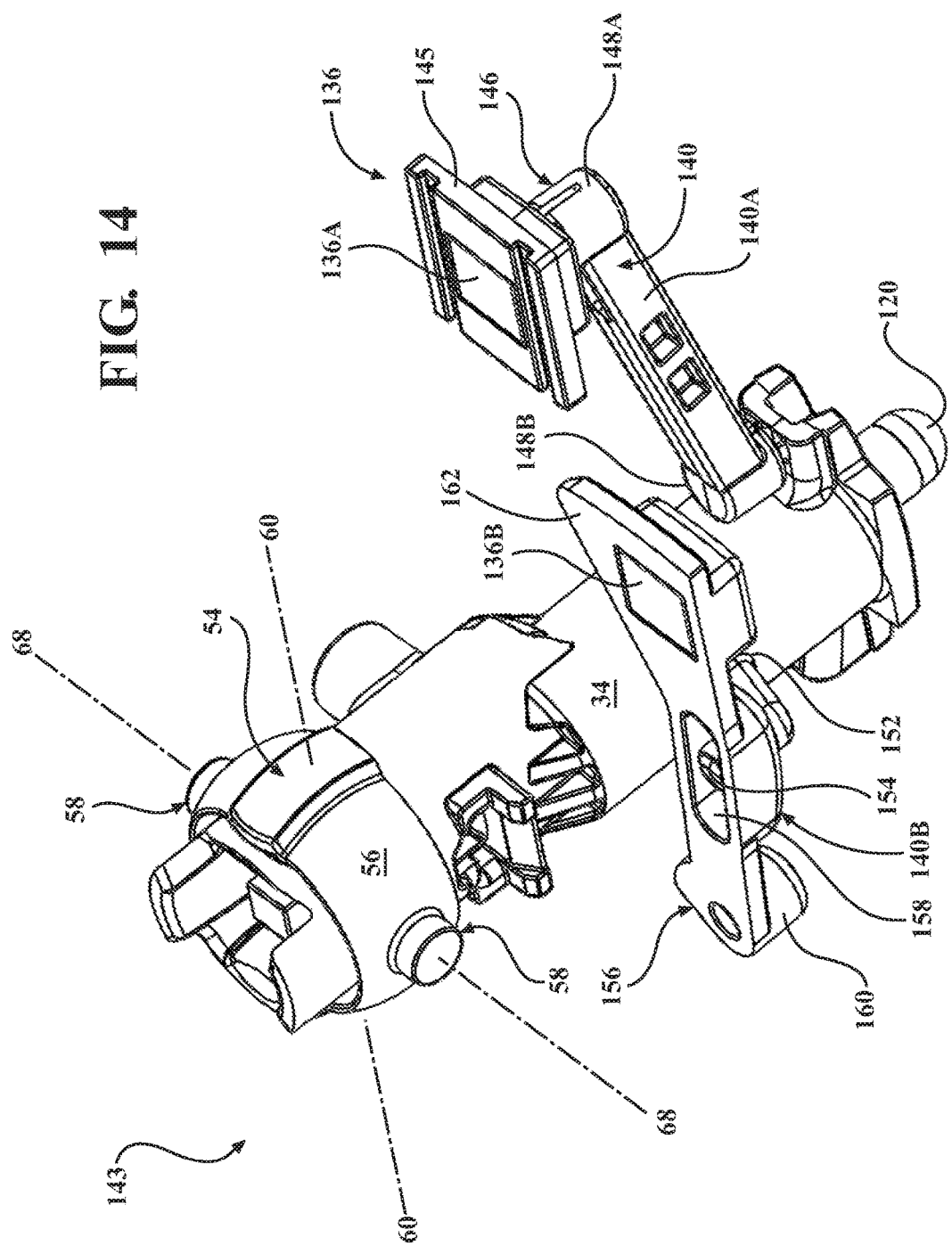
FIG. 14 is another perspective view of the shifter subassembly of FIG. 13.

Referring now to FIGS. 1-17, as noted above, the shift lever 34 is pivotally mounted to the housing 32. To that end, and in one embodiment, the shifter assembly 30 includes a first pivot mechanism 54, a gimbal ring 56, and a second pivot mechanism 58. The first pivot mechanism 54 is mounted to the shift lever 34 so as to permit movement of the shift lever 34 relative to the housing 32 about a first pivot axis 60 within one of the gates 36, 40, 44. The gimbal ring 56 has an outer surface 62 and an inner surface 64 defining an aperture 66 with the gimbal ring 56 disposed about and coupled to the shift lever 34, the shift lever 34 extending through the aperture 66. The second pivot mechanism 58 is mounted to the gimbal ring 56 so as to permit movement of the shift lever 34 relative to the housing 32 about a second pivot axis 68 within another of the gates 36, 40, 44, the second pivot axis 68 being spaced from the first pivot axis 60. As shown best in FIGS. 13 and 17, in one embodiment, the first pivot axis 60 is substantially perpendicular to the second pivot axis 68. However, it will be appreciated that the pivot axes 60, 68 could be disposed, aligned, spaced, or otherwise configured with respect to each other in any suitable way. The gimbal ring 56 has a pair of pivot receivers 70 recessed from the inner surface 64 and spaced from the outer surface 62, with the first pivot mechanism 54 of the shift lever 34 engaging each of the pivot receivers 70 so as to pivotally couple the shift lever 34 to the gimbal ring 56. In one embodiment, the gimbal ring 56 pivots in unison with the shift lever 34 during the pivoting of the shift lever 34 about the second pivot axis 68 (compare FIGS. 7-9).

Figure 17:
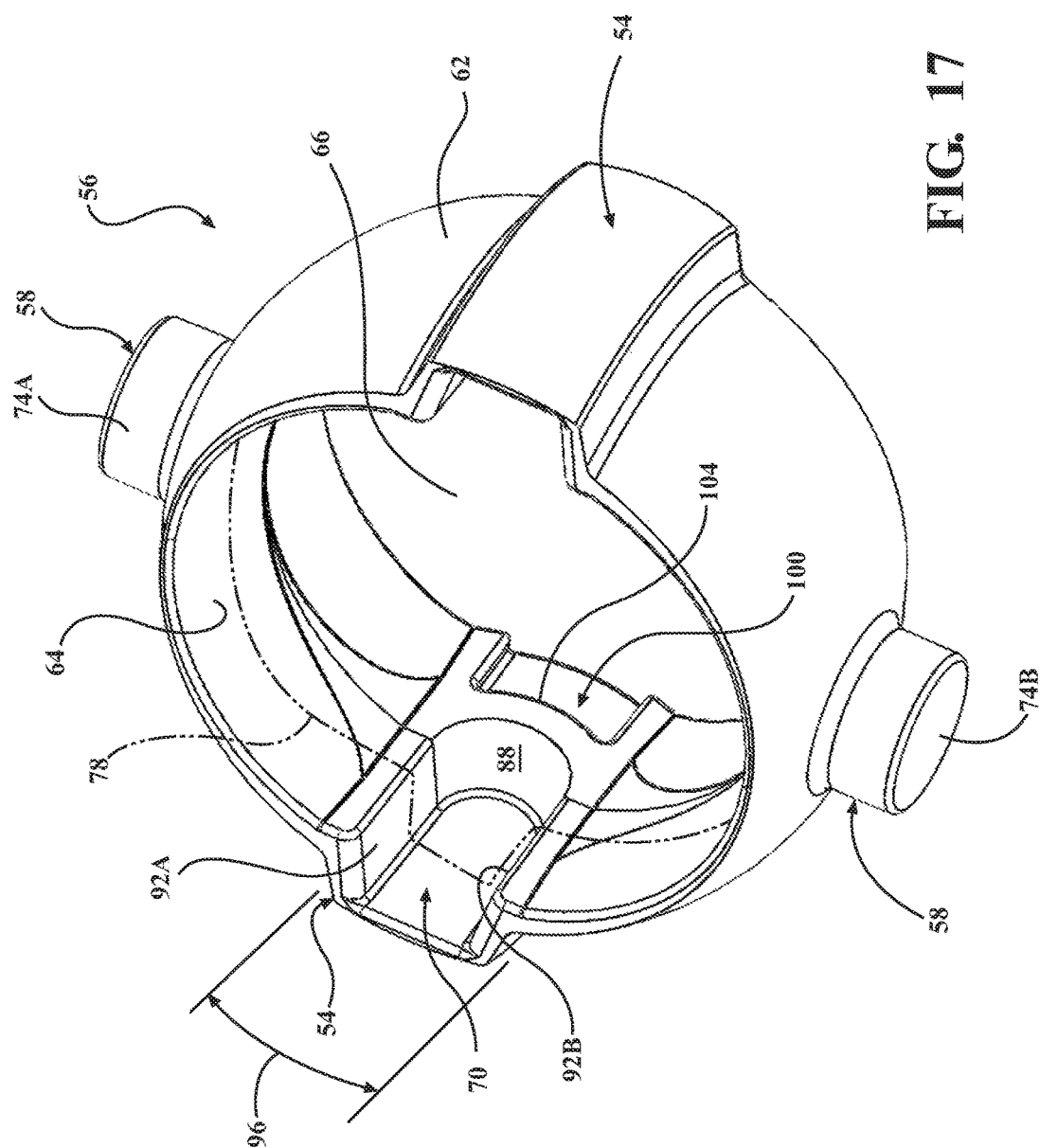
FIG. 17 is an enlarged perspective view of the gimbal ring of FIG. 15.
Figure 18:
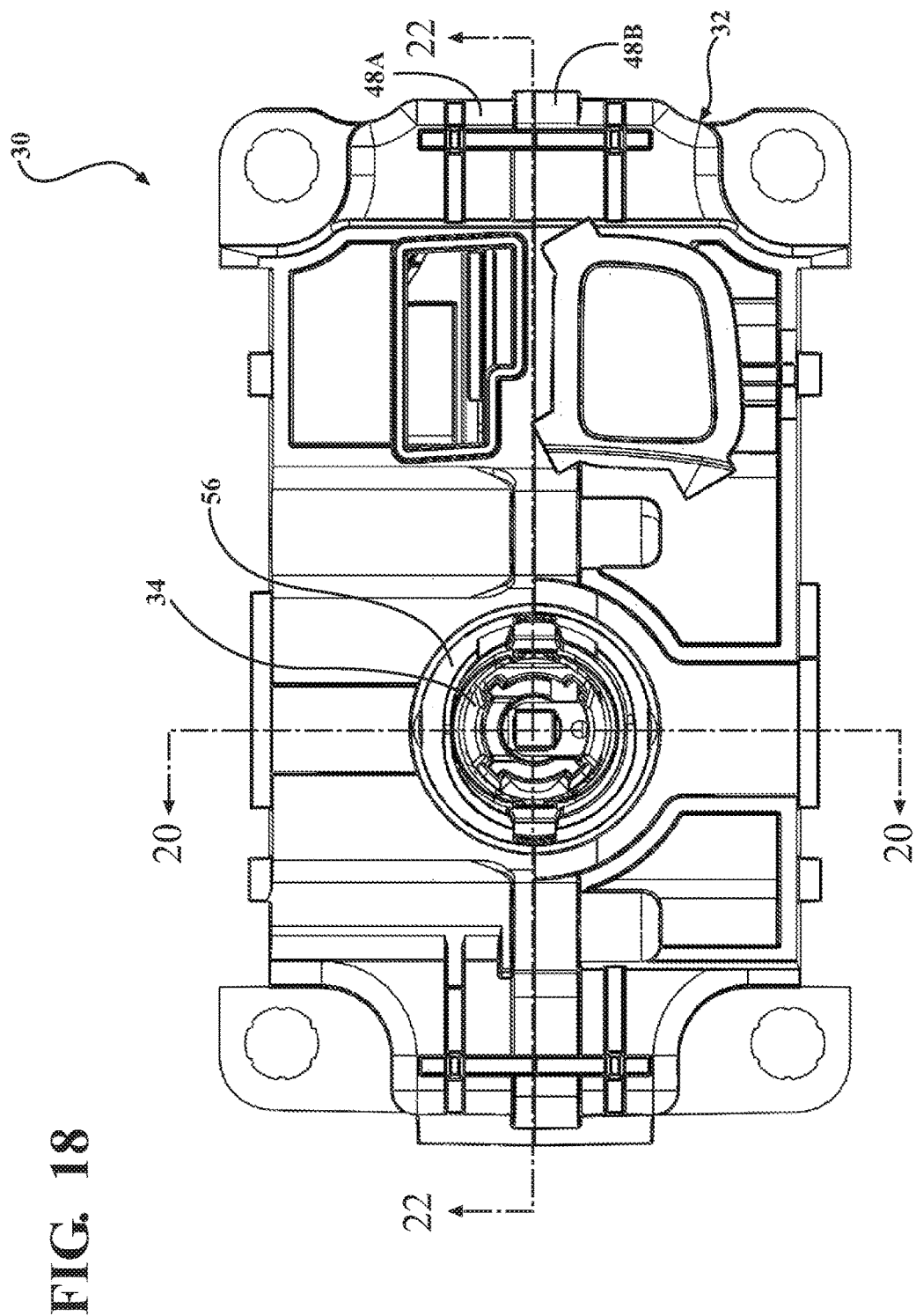
FIG. 18 is a top view of the shifter assembly of FIG. 1 without the shift knob.
Figure 19:
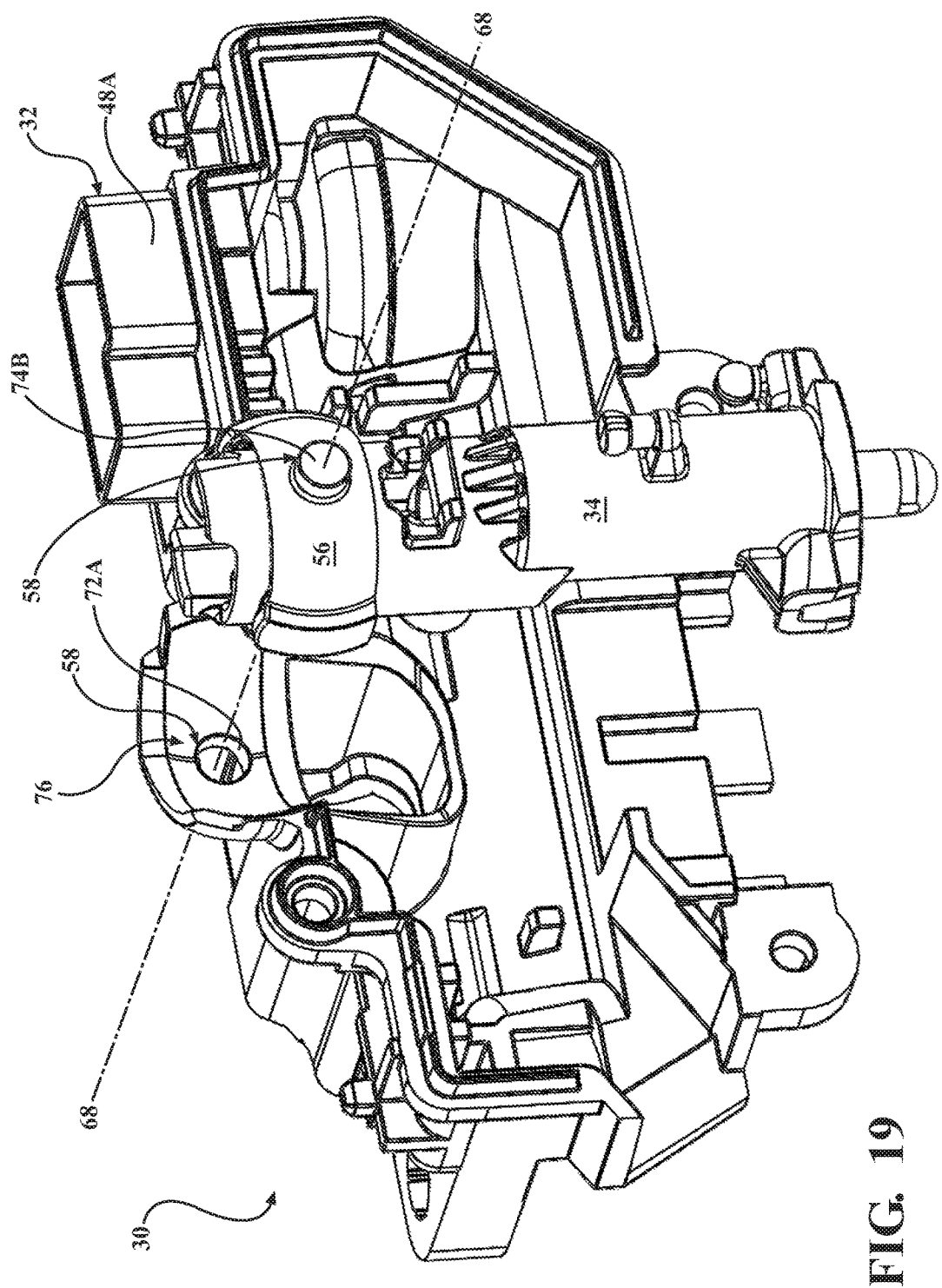
FIG. 19 is a perspective view of the shifter assembly of FIGS. 2 and 15 showing one of the housing elements, the shift lever, and the gimbal ring.

Referring now to FIGS. 2, 17, and 19, in one embodiment, the second pivot mechanism 58 includes a pair of bores 72A, 72B defined in the housing 32, and a pair of opposing protrusions 74A, 74B extending from the outer surface 62 of the gimbal ring 56. As shown best in FIG. 17, the protrusions 74A, 74B are separated from each other and are spaced from the aperture 66 of the gimbal ring 56. Where the housing 32 is formed from at least two housing elements that cooperate to pivotally support the gimbal ring 56, such as the side elements 48A, 48B discussed above, one of each of the bores 72A, 72B of the second pivot mechanism 58 may be defined in each of the housing side elements 48A, 48B. Further, each of the housing side elements 48A, 48B may include an arcuate receiver 76A, 76B disposed adjacent to the bore 72A, 72B of the second pivot mechanism 58 having a configuration complementary to the outer surface 62 of the gimbal ring 56 for accommodating the gimbal ring 56.

Figure 15:
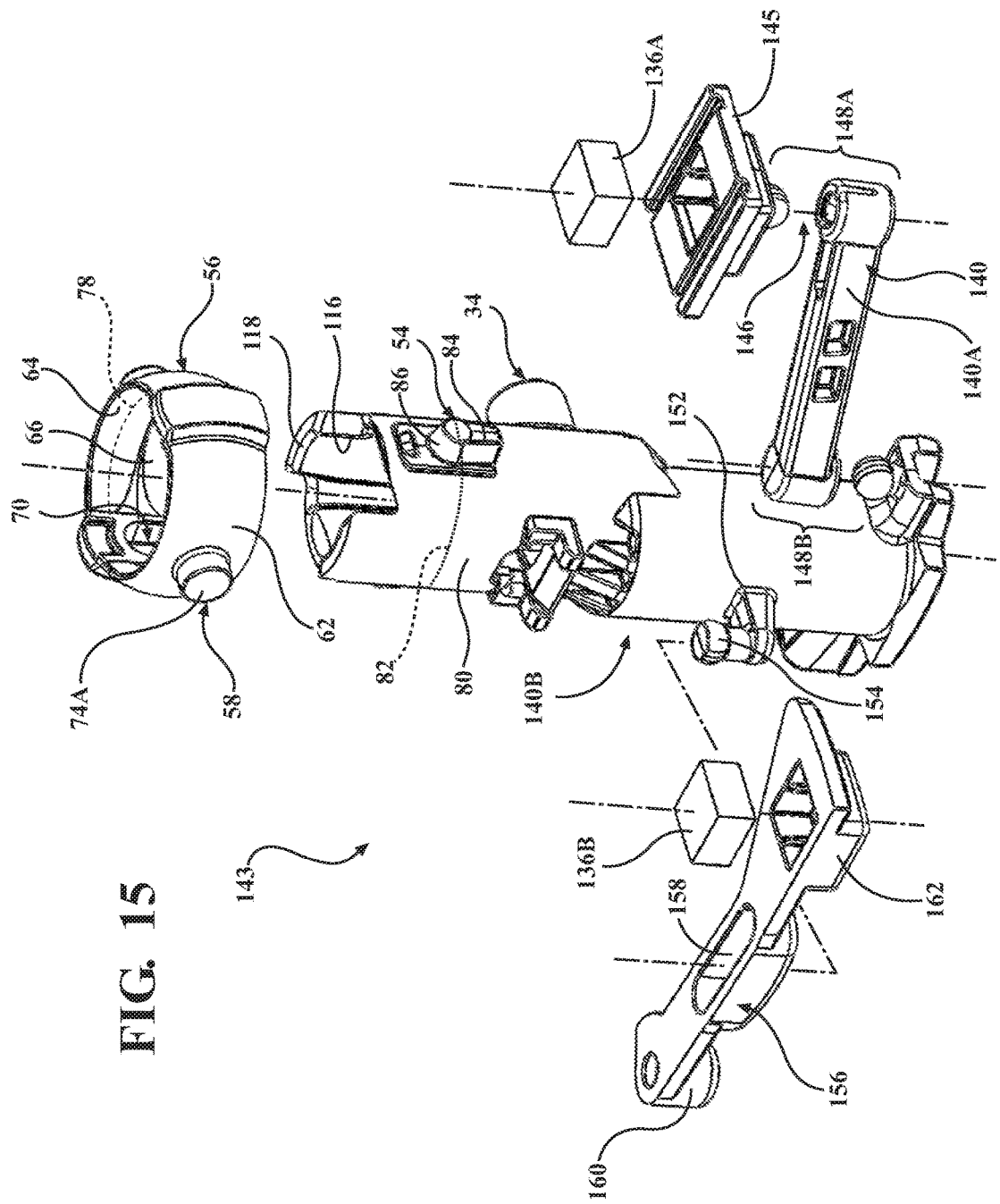
FIG. 15 is an exploded perspective view of the shifter subassembly of FIG. 6A, showing a shift lever, a gimbal ring, a pair of emitters, and a pair of links.
Figure 16:
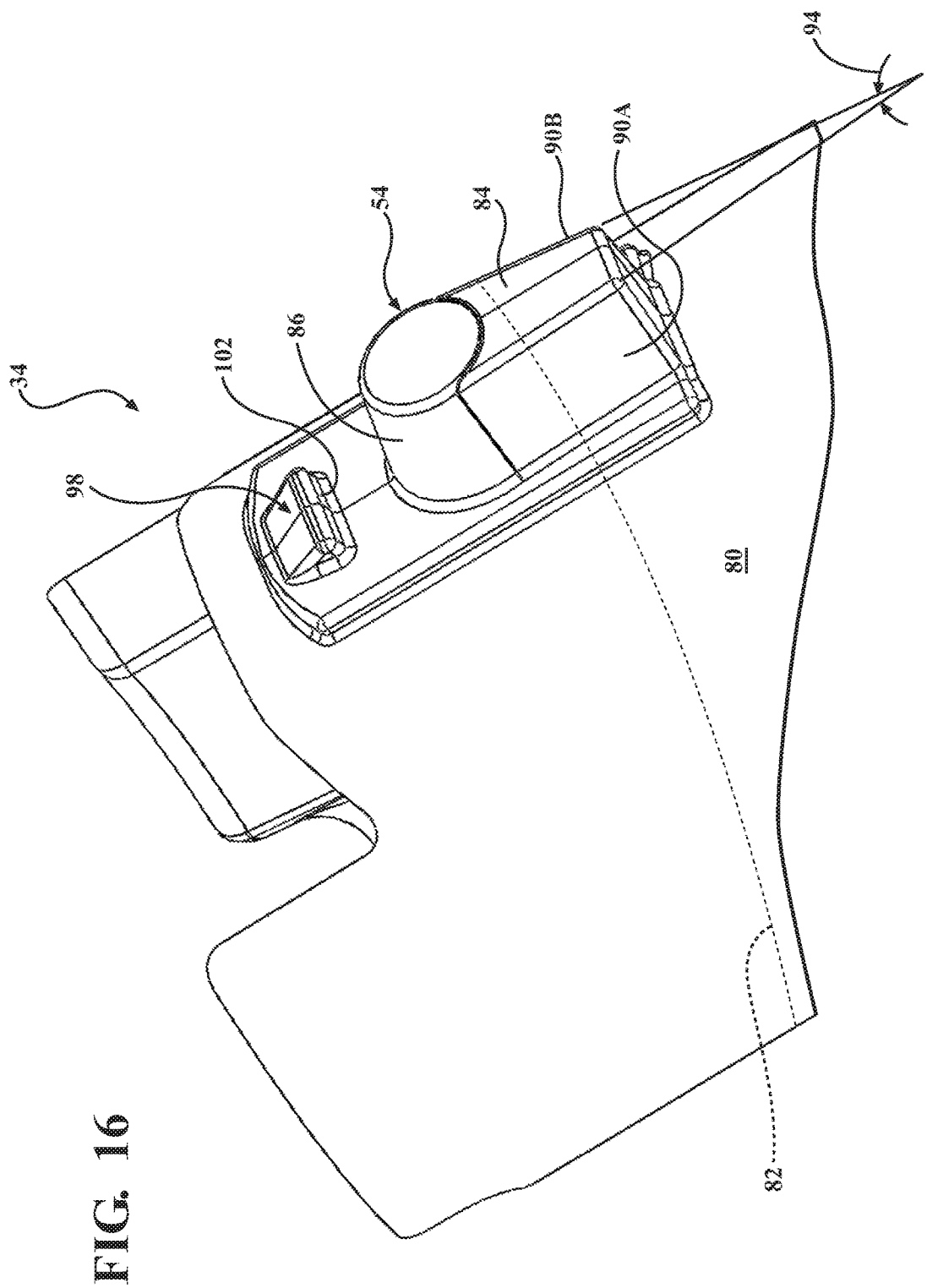
FIG. 16 is an enlarged partial perspective view of one end of the shift lever of FIG. 15.

As noted above, the shift lever 34 extends through the aperture 66 of the gimbal ring 56. To that end, and as shown in FIGS. 15-17, the inner surface 64 of the gimbal ring 56 defines a first perimeter 78, and the shift lever 34 has an outer surface 80 adjacent the first pivot mechanism 54 defining a second perimeter 82. The first perimeter 78 is larger than the second perimeter 82 so as to permit relative movement between the shift lever 34 and the gimbal ring 56 as the shift lever 34 moves in at least one of the gates 36, 40, 44.

As shown best in FIGS. 15 and 16, the first pivot mechanism 54 includes a pair of opposing pivot keys 84 mounted to the shift lever 34 that cooperate with the pivot receivers 70 of the gimbal ring 56 so as to allow movement of the shift lever 34 about the first pivot axis 60. The pivot keys 84 are separately mounted to the shift lever 34 and each extend outwardly from the shift lever 34. The pivot keys 84 of the shift lever 34 each have a key bearing surface 86, and the pivot receivers 70 of the gimbal ring 56 have a receiver bearing surface 88. The key bearing surfaces 86 cooperate with the receiver bearing surfaces 88 so as to facilitate movement of the shift lever 34 about the first pivot axis 60. In one embodiment, the key bearing surfaces 86 and the receiver bearing surfaces 88 each have a tapered profile. More specifically, the tapered profile of the bearing surfaces 86, 88 are at least partially conical. Each of the pivot keys 84 of the shift lever 34 have a pair of key walls 90A, 90B depending from the key bearing surface 86, and each of the pivot receivers 70 of the gimbal ring 56 have a pair of receiver walls 92A, 92B. The receiver walls 92A, 92B cooperate with the key walls 90A, 90B so as to limit movement of the shift lever 34 about the first pivot axis 60. The key walls 90A, 90B of the pivot keys 84 define a first angle 94 therebetween (see FIG. 16) and the receiver walls 92A, 92B of the pivot receivers 70 define a second angle 96 therebetween (see FIG. 17). The second angle 96 is larger than the first angle 94 and may be configured so as to optimize the limitation of movement of the shift lever 34 about the first pivot axis 60, whereby a larger differential between the angles 94, 96 correlates to a wider range of movement of the shift lever 34 about the first pivot axis 60.

Referring now to FIGS. 15, 16, and 20-23, the pivot keys 84 have an axial lock 98 spaced from the key bearing surface 86, and the pivot receivers 70 have an axial lock receiver 100 spaced from the receiver bearing surface 88. The axial lock 98 cooperates with the axial lock receiver 100 so as to at least partially limit axial translation of the shift lever 34 with respect to the gimbal ring 56. It will be appreciated that this configuration enables simplified assembly of the shifter assembly 30, as well as consistent and predictable operation of the shift lever 34. In one embodiment, the axial lock 98 of the pivot key 84 is further defined as a tooth 102, and the axial lock receiver 100 of the pivot receiver 70 is further defined as a notch 104 for engaging the tooth 102.

As noted above, the shifter assembly 30 of the present invention is configured so as to enable the driver to operate the transmission 31 in a conventional automatic shifting mode and select between a plurality of vehicle driving modes such as "park," "neutral," "reverse," and "drive", as well as operate the transmission 31 in a "sport" manual shifting mode and selectively "shift up" and "shift down" to change between gear sets. As will be appreciated from the description of the movement of the shift lever 34 and gates 36, 40, 44 below, the shifter assembly 30 of the present invention is also configured so as to simplify the process of changing between the automatic shifting mode and the "sport" manual shifting mode. To that end, movement of the shift lever 34 along the bridge gate 44 between the first gate 36 (see FIG. 10) and the second gate 40 (see FIG. 12) may correlate to a change in the shifting mode of the transmission 31 (compare FIG. 11 to FIGS. 10 and 12). By way of non-limiting example, the first gate 36 could represent the automatic shifting mode and the second gate 40 could represent the "sport" manual shifting mode, wherein the first plurality of shift paths 38A, 38B would represent selection between vehicle driving modes (such as "neutral," "reverse," or "drive") and the second plurality of shift paths 42A, 42B would represent selection between gear sets (such as "shift up" or "shift down") (compare FIG. 7 to FIGS. 8 and 9). However, it will be appreciated that the gates 36, 40, 44 could represent different shifting modes, vehicle driving modes, or entirely different functionality without departing from the scope of the present invention.

As shown best in the schematic representation of movement of shift lever 34 of the shifter assembly 30 in FIG. 26, in one embodiment, the bridge gate 44 is substantially perpendicular to at least one of the first gate 36 and the second gate 40. Similarly, the first gate 36 may be substantially parallel to the second gate 40. However, those having ordinary skill in the art will appreciate that the gates 36, 40, 44 could be disposed, aligned, or otherwise configured in any suitable way without departing from the scope of the present invention. In one embodiment, a first stable position 106 is defined where the bridge gate 44 intersects the first gate 36, and a second stable position 108 is defined where the bridge gate 44 intersects the second gate 40 (see FIG. 7). The shift lever 34 is biased: toward the first stable position 106 when the shift lever 34 moves along the first plurality of shift paths 38A, 38B (see FIG. 10), and toward the second stable position 108 when the shift lever 34 moves along the second plurality of shift paths 42A, 42B (see FIG. 12).

The first plurality of shift paths 38A, 38B includes a first pair of unstable positions 110A, 110B spaced from the first stable position 106, and the second plurality of shift paths 42A, 42B includes a second pair of unstable positions 112A, 112B spaced from the second stable position 108. The shift lever 34 is biased: away from each of the first pair of unstable positions 110A, 110B toward the first stable position 106 when the shift lever 34 moves in the first gate 36, and away from each of the second pair of unstable positions 112A, 112B toward the second stable position 108 when the shift lever 34 moves in the second gate 40. The shift lever 34 is biased along the bridge gate 44 toward the first stable position 106 when the shift lever 34 is closer to the first stable position 106 than to the second stable position 108.

Figure 20:
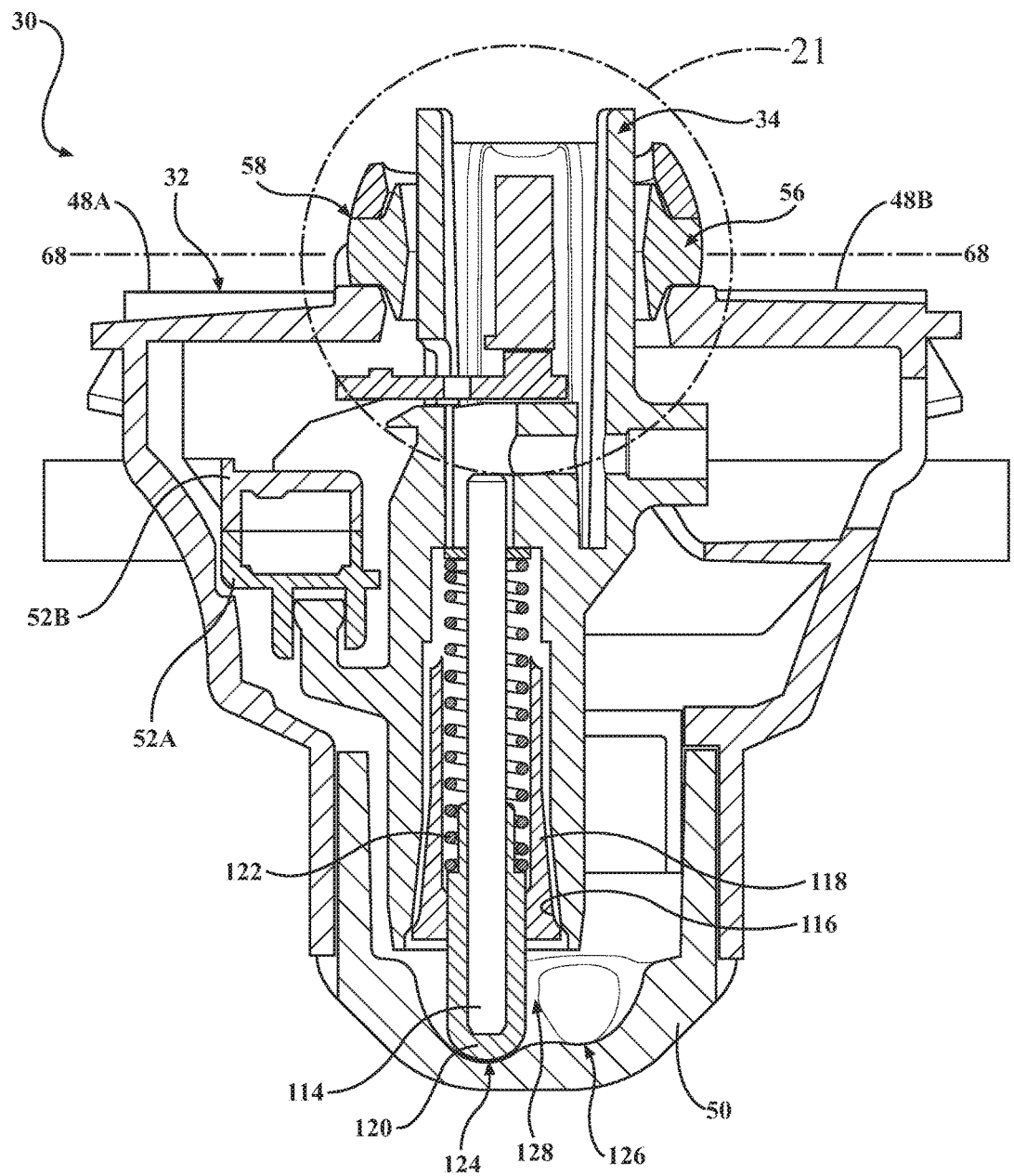
FIG. 20 is a sectional view taken along line 20-20 of FIG. 18.
Figure 21:
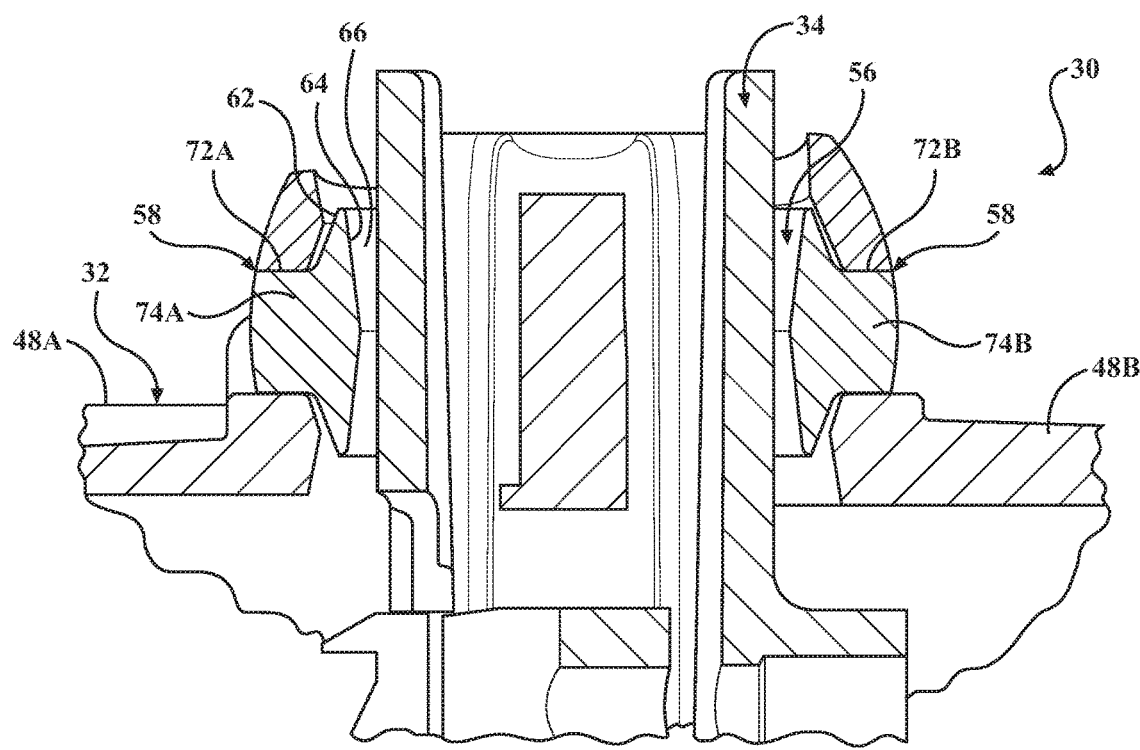
FIG. 21 is an enlarged sectional view taken from FIG. 20.
Figure 23:
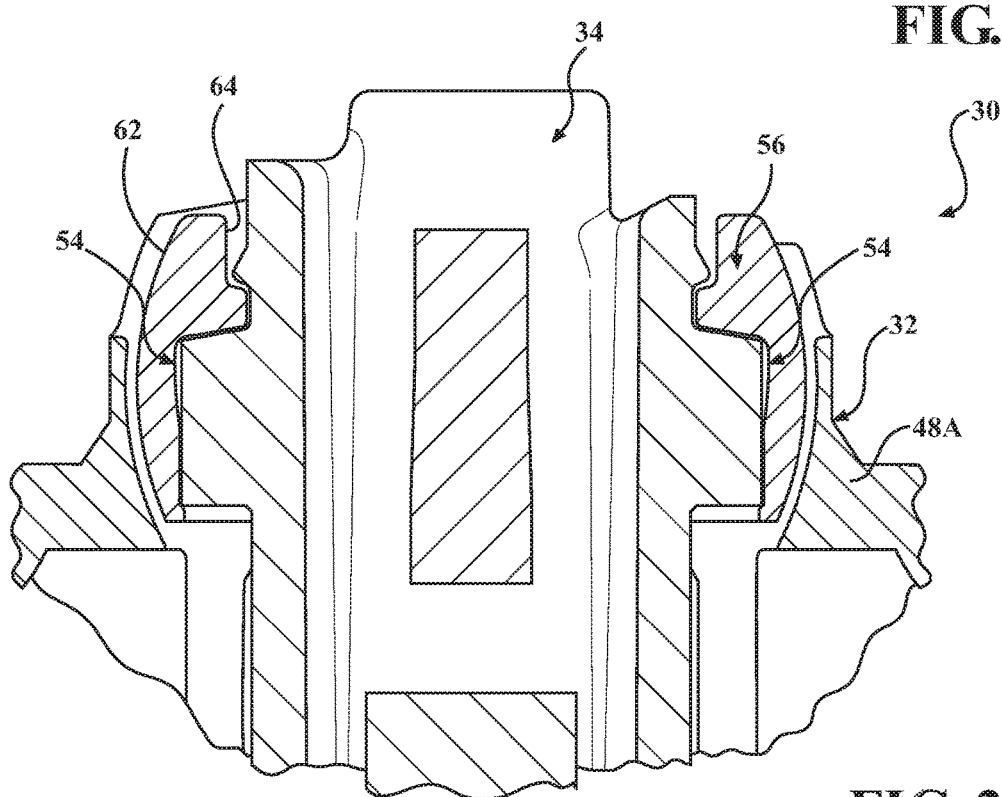
FIG. 23 is an enlarged sectional view taken from FIG. 22.
Figure 22:
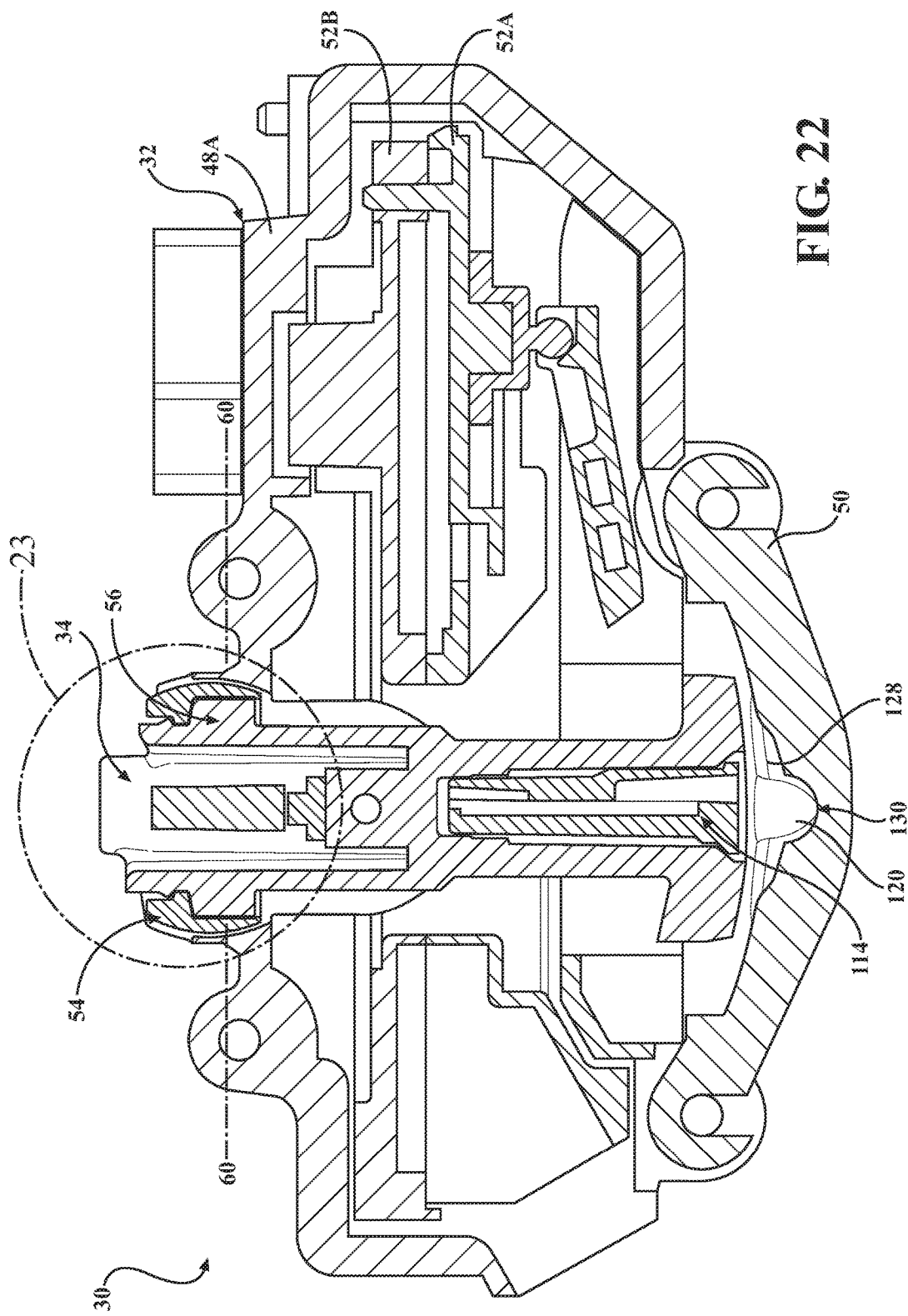
FIG. 22 is a sectional view taken along line 22-22 of FIG. 18.
Figure 25:
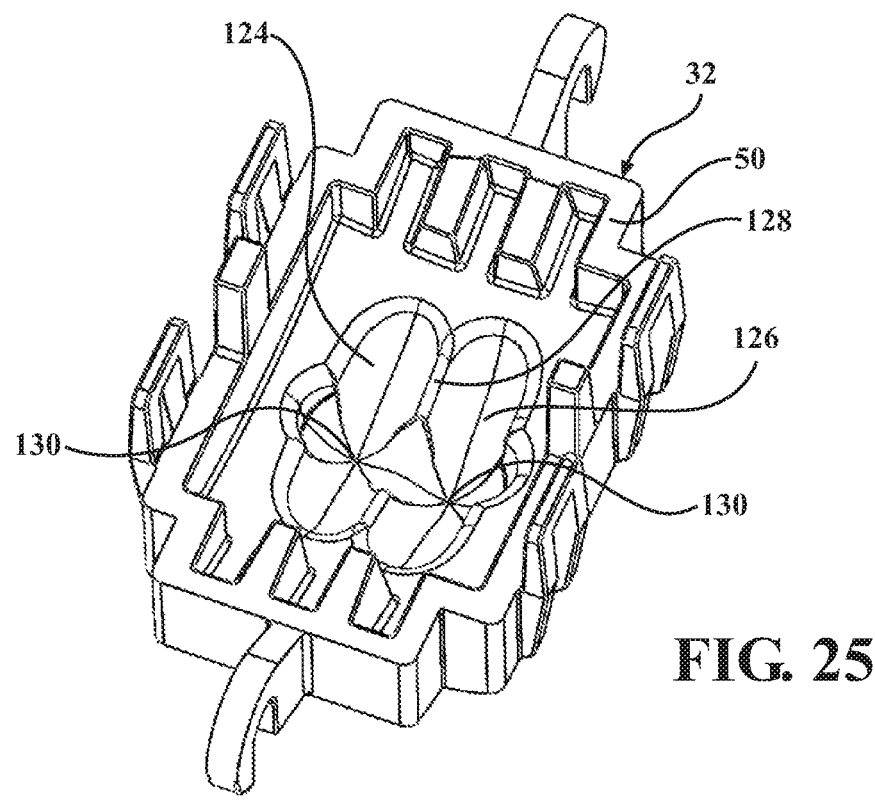
FIG. 25 is a perspective view of the housing lower element of FIG. 2.

Referring now to FIGS. 20, 22, and 25, in one embodiment, the shifter assembly 30 further includes a detent mechanism, generally indicated at 114, disposed between the shift lever 34 and the housing 32 for biasing the shift lever 34 along the bridge gate 44 between the first stable position 106 and the second stable position 108. More specifically, the detent mechanism 114 is disposed between the shift lever 34 and the housing lower element 50. Further, in one embodiment, the shift lever 34 has an inner surface 116 defining an inner chamber 118, and the detent mechanism 114 may be at least partially disposed within the inner chamber 118 of the shift lever 34, and at least partially adjacent to said first pivot mechanism 54. Moreover, it will be appreciated that the inner chamber 86 of the shift lever 34 may be configured to extend through the gimbal ring 56 and to the shift knob 46 and, as such, can provide accommodation for wires, internal components, sensors, and the like, as well as increased packaging flexibility.

The detent mechanism 114 includes a plunger 120 biased by a spring 122 and coupled to the shift lever 34, and first and second receivers 124, 126 defined in the housing 32, specifically in the housing lower element 50. As shown best in FIG. 20, the spring 122 is a compression spring. However, those having ordinary skill in the art will appreciate that the spring 122 could be of any suitable type without departing from the scope of the present invention. The spring-biased plunger 120 engages the first receiver 124 when the shift lever 34 is in the first gate 36, and engages the second receiver 126 when the shift lever 34 is in the second gate 40. The spring-biased plunger 120 is adapted to axially bias the shift lever 34 with respect to the second pivot mechanism 58.

In one embodiment, the shifter assembly 30 further includes a ramp 128 disposed between the first receiver 124 and the second receiver 126. The ramp 128 urges the plunger 120 of the detent mechanism 114 toward the closer of the first receiver 124 and the second receiver 126 such that the shift lever 34 is biased: toward the first stable position 106 when the shift lever 34 moves along the first plurality of shift paths 38A, 38B, and toward the second stable position 108 when the shift lever 34 moves along the second plurality of shift paths 42A, 42B. As shown best in FIGS. 22 and 25, at least one of the first receiver 124 and the second receiver 126 has a substantially arcuate profile with a central apex 130, and the plunger 120 of the detent mechanism 114 is disposed adjacent to the central apex 130 when the shift lever 34 is in one of the first stable position 106 and the second stable position 108. The arcuate profile of the receivers 124, 126 urges the plunger 120 toward the central apex 130 such that the shift lever 34 is biased: away from each of the first pair of unstable positions 110A, 110B toward the first stable position 106 when the shift lever 34 moves in the first gate 36, and away from each of the second pair of unstable positions 112A, 112B toward the second stable position 108 when the shift lever 34 moves in the second gate 40.

Figure 24:
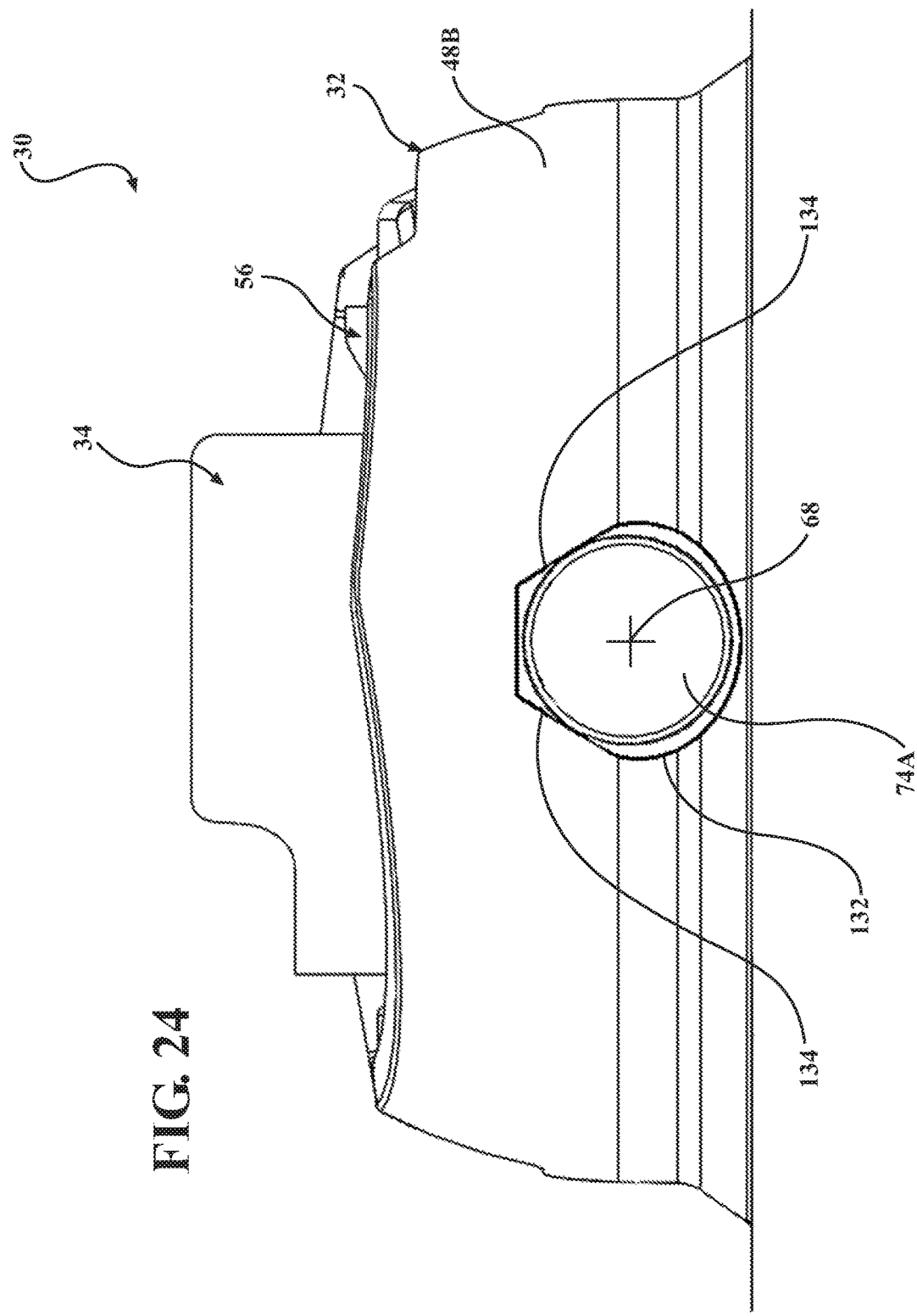
FIG. 24 is a fragmented side view showing an alternative embodiment of the shifter assembly of the present invention.

As noted above, in one embodiment of the shifter assembly 30 of the present invention, the second pivot mechanism 58 includes a pair of bores 72A, 72B defined in the housing 32, and a pair of opposing protrusions 74A, 74B extending from the outer surface 62 of the gimbal ring 56. As shown in FIG. 19, the bores 72A, 72B and the protrusions 74A, 74B have a substantially cylindrical profile. Referring now to FIG. 24, in an alternate embodiment of the shifter assembly 30 of the present invention, the second pivot mechanism 58 includes a pair of sockets 132 (only one socket 132 is shown in FIG. 24) defined in the housing 32, and a pair of opposing protrusions 74A, 74B extending from the outer surface 62 of the gimbal ring 56. Each of the sockets 132 has inclined walls 134 with the spring-biased plunger 120 urging the protrusions 74A, 74B of the gimbal ring 56 against the inclined walls 134 of the sockets 130. Each of the sockets 132 is slightly larger than the protrusions 74A, 74B such that when the protrusions 74A, 74B are urged against the inclined walls 134 a space is created between the protrusions 74A, 74B and a bottom of the sockets 132.

Referring now to FIGS. 1-15, in one embodiment of the present invention, the shifter assembly 30 includes one or more sensing arrangements for electronically recognizing or registering movements of the shift lever 34. Each sensing arrangement will be discussed in greater detail below. One such sensing arrangement includes an emitter 136, a detector 138, and a link 140. The emitter 136 is spaced from the shift lever 34 and is movable along a fixed path, generally indicated at 142. The detector 138 is coupled to the housing 32 for determining a position of the emitter 136 along the fixed path 142. The link 140 is operatively attached to the shift lever 34 and the emitter 136 such that the movement of the shift lever 34 in the first gate 36 causes corresponding movement of the emitter 136 along the fixed path 142, and the movement of the shift lever 34 in the second gate 40 causes corresponding movement of the emitter 136 also along the fixed path 142. In other words, movement of the shift lever 34 in both the first gate 36 and the second gate 40 causes corresponding movement of the same emitter 136 along the same fixed path 142.

The link 140 is coupled to the shift lever 34 and the emitter 136 in such a manner as to permit movement of the shift lever 34 relative to the link 140 during the movement of the shift lever 34. In other words, the link 140 is capable of rotating, angling, translating or the like in one or more directions relative to the shift lever 34. Stated yet another way, although the movement of the link 140 is tied to or dependent upon the movement of the shift lever 34, the movement of the link 140 is not in unison with the shift lever 34 and these components do no move as a single unit. As shown, the link 140 is coupled to at least one of the shift lever 34 and the emitter 136 through a rotatable joint, generally indicated at 146. The rotatable joint 146 permits the relative movement of the link 140 to the shifter lever 34 without restricting or binding the movement of the shift lever 34.

The shift lever 34, gimbal ring 56, emitter 136, link 140, and other components cooperate to define a shifter subassembly, generally indicated at 143, that is supported by and at least partially within the housing 32. Each of these components, as well as additional components of the shifter subassembly 143, will be described in greater detail below.

As best shown in FIG. 5, in one embodiment, the shifter assembly 30 further includes a track 144 and a guide 145. The track 144 is operatively attached to the housing 32 and, more specifically, is formed in a lower of the housing inner elements 52A. The guide 145 is supported in and movable along the track 144 with the emitter 136 and the link 140 both operatively attached to the guide 145 such that the fixed path 142 is defined by movement of the guide 145 along the track 144. In one embodiment, the fixed path 142 is substantially parallel to at least one of the first gate 36 and the second gate 40. Further, in one embodiment, the fixed path 142 has a substantially linear profile (compare FIGS. 7-9).

Figure 7:
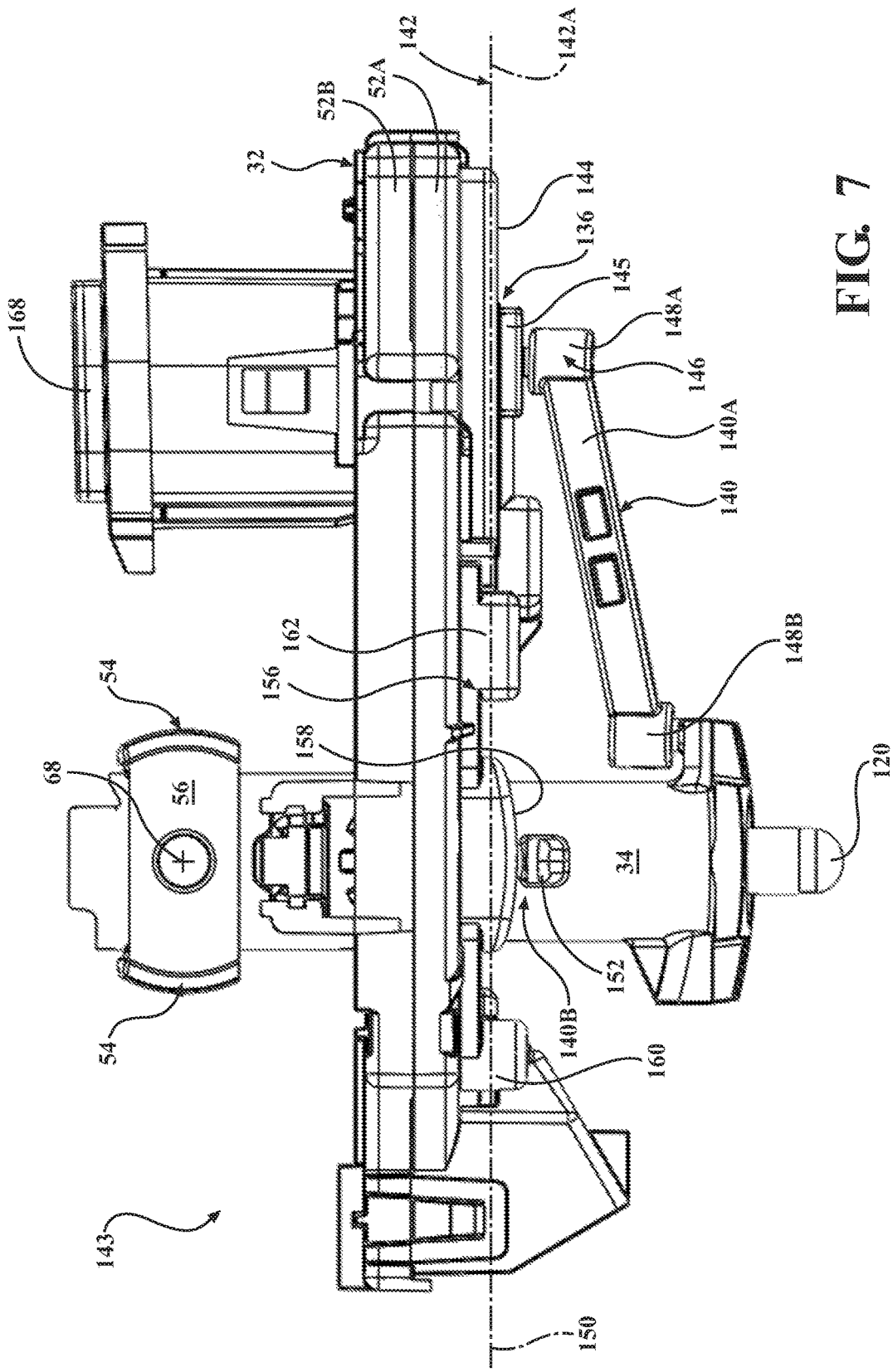
FIG. 7 is a side view of the shifter subassembly and housing inner elements of FIG. 6A showing the shifter subassembly in a stable configuration.
Figure 8:
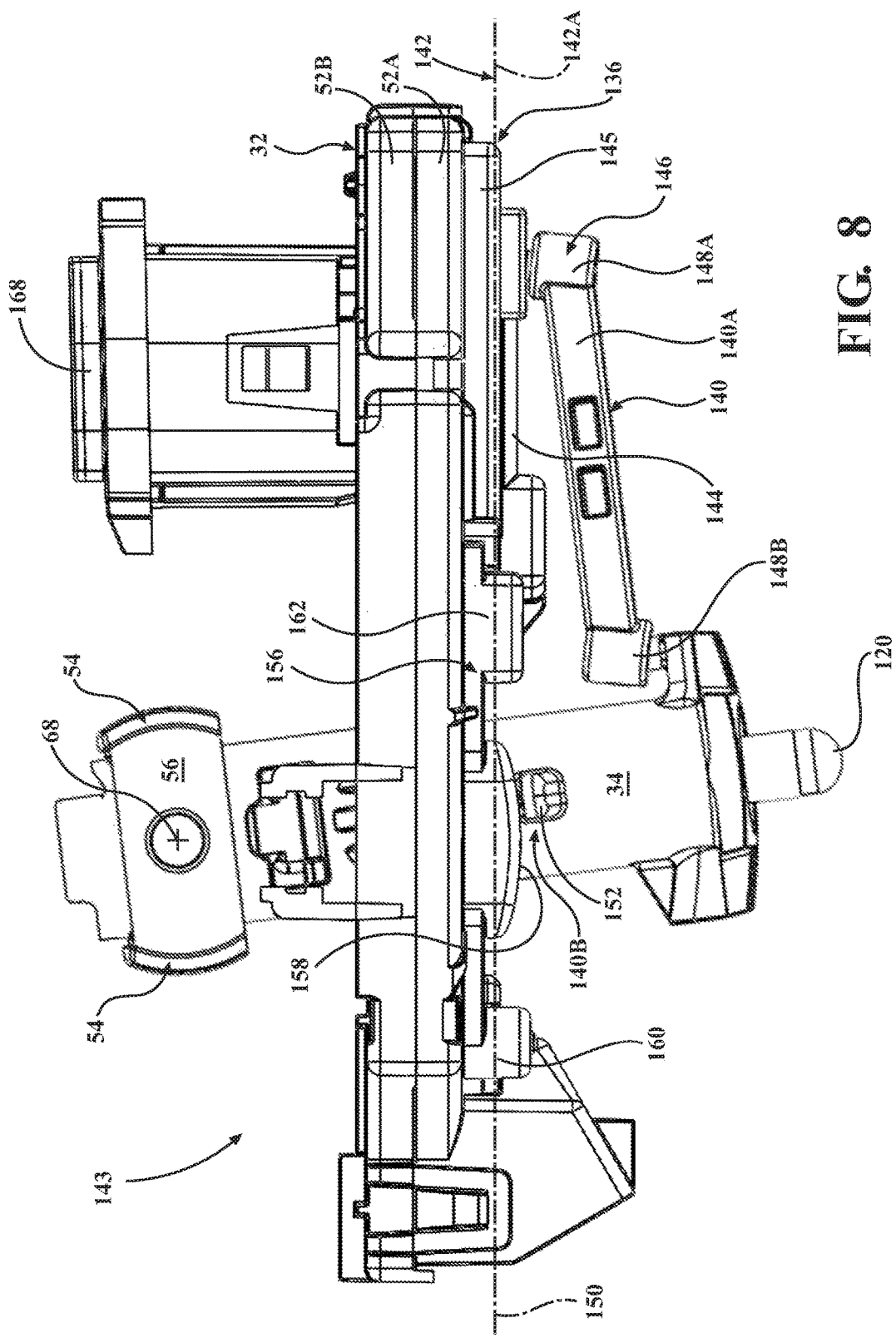
FIG. 8 is a side view of the shifter subassembly and housing inner elements of FIG. 7 showing the shifter subassembly in a first unstable configuration.
Figure 9:
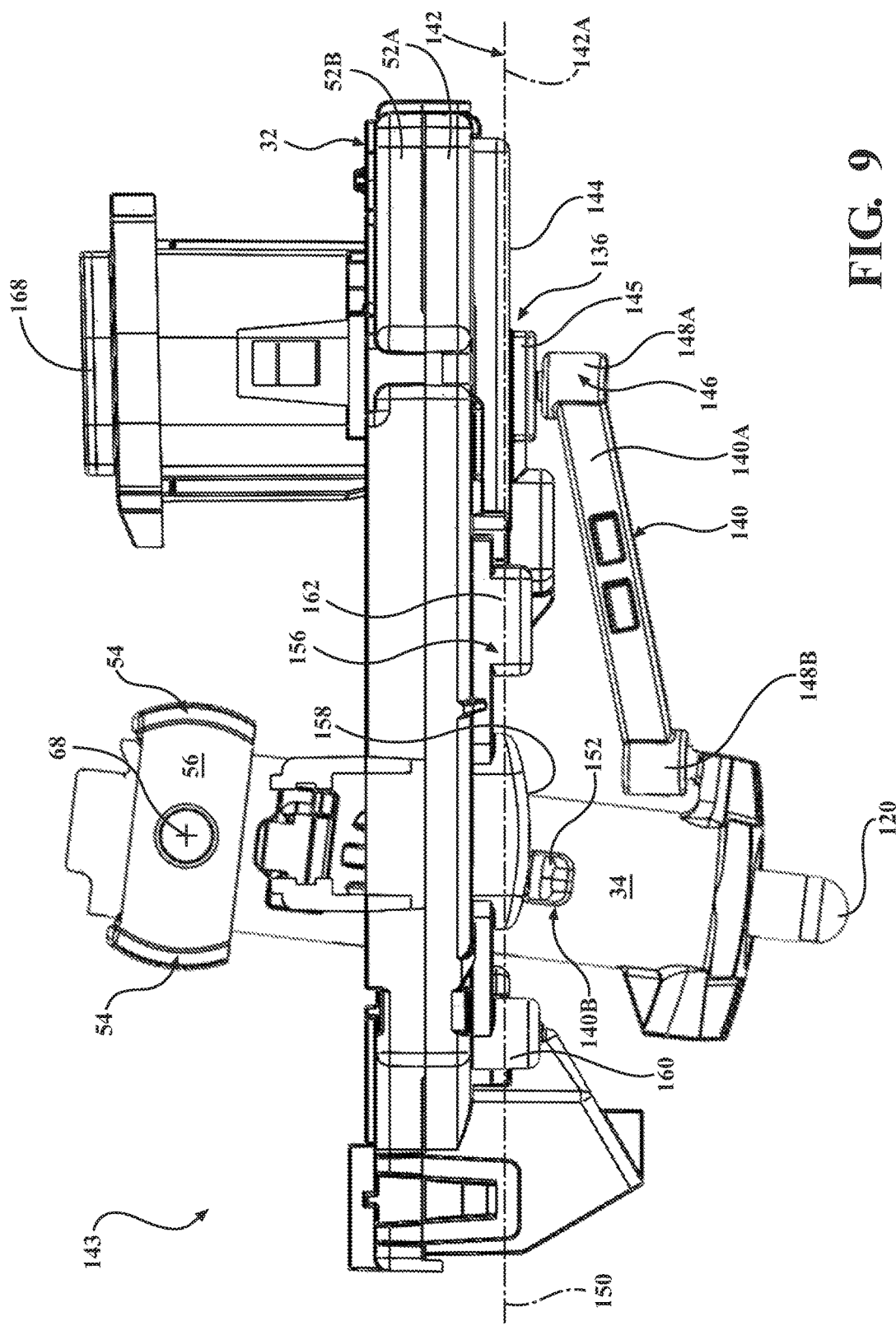
FIG. 9 is a side view of the shifter subassembly and housing inner elements of FIG. 7 showing the shifter subassembly in a second unstable configuration.
Figure 10:
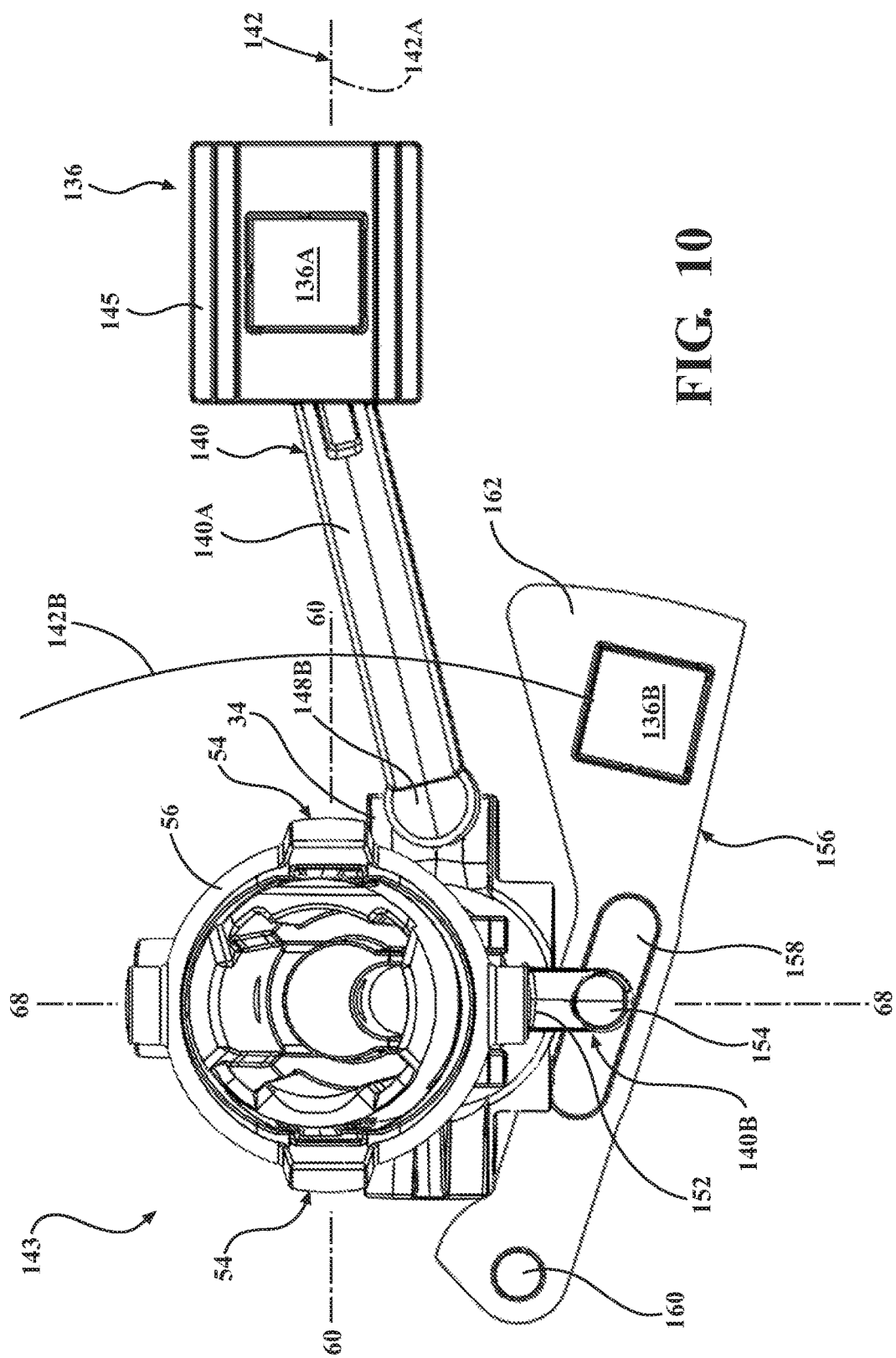
FIG. 10 is a top view of the shifter subassembly of FIG. 6A in a first stable gate position.
Figure 11:
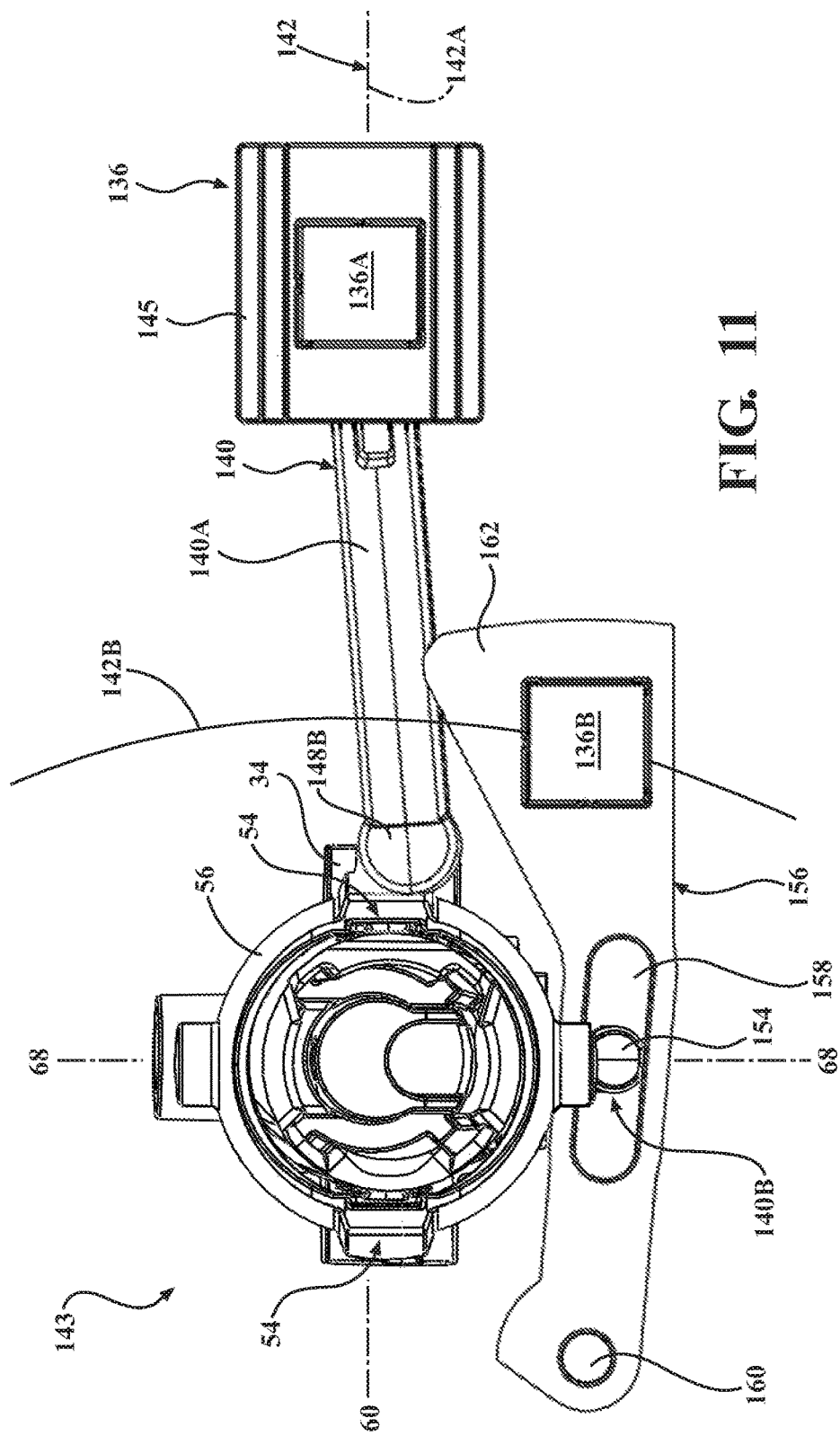
FIG. 11 is a top view of the shifter subassembly of FIG. 10 in an unstable gate position.
Figure 12:
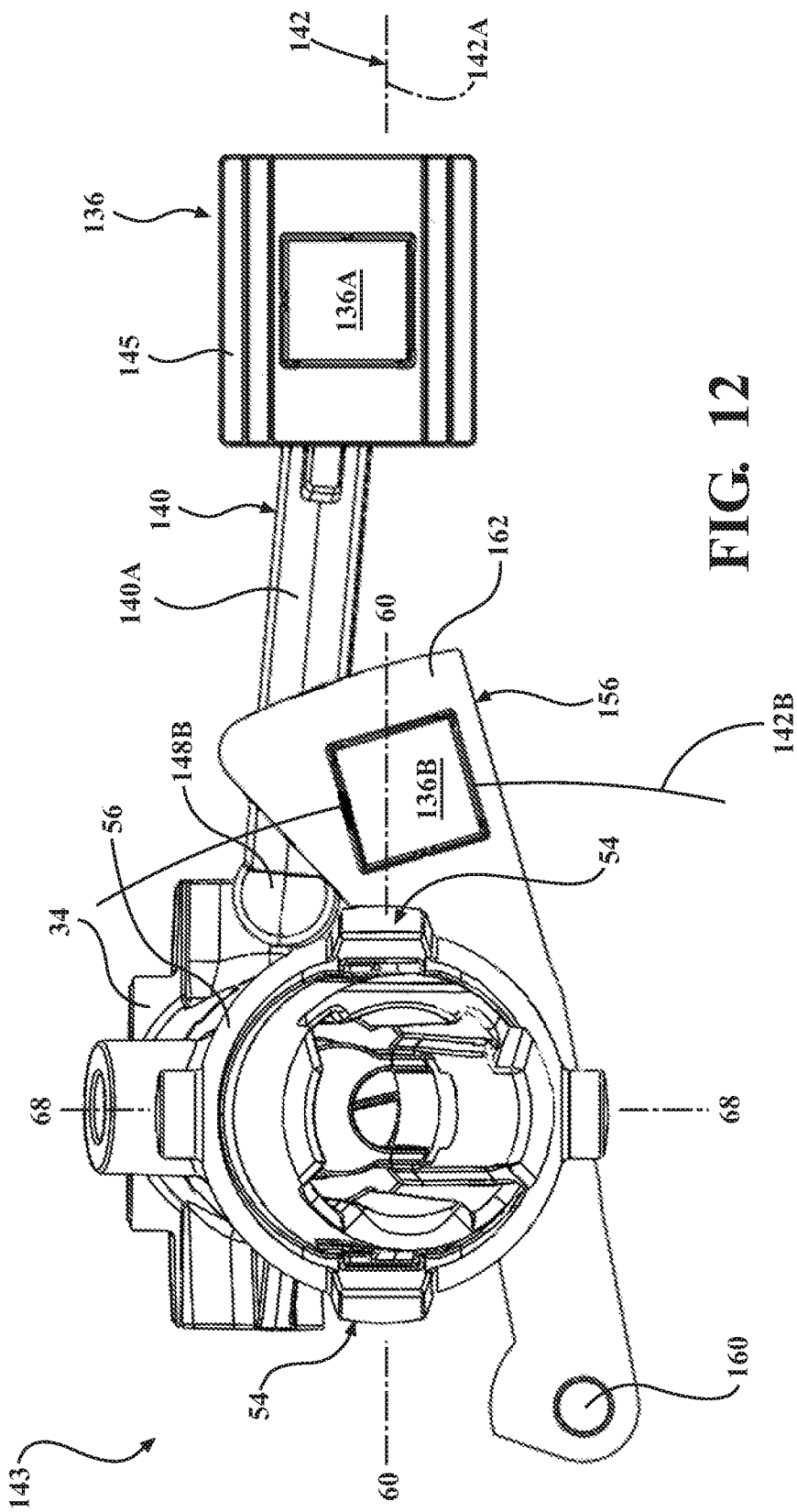
FIG. 12 is a top view of the shifter subassembly of FIG. 10 in a second stable gate position.

As illustrated throughout the Figures, the link 140 is coupled to both of the shift lever 34 and the emitter 136 through corresponding ball joints 148A, 148B. As such, the rotatable joint 146, in the embodiment shown, if further defined as ball joints. More specifically, the guide 145 and the link 140 are pivotally coupled about a first ball joint 148A, and the shift lever 34 and the link 140 are pivotally coupled about the second ball joint 148B. It should be appreciated that the rotatable joint 146 may be of any suitable configuration. Referring now to FIGS. 7-9, in one embodiment, the fixed path 142 defines a plane 150 and the shift lever 34 intersects the plane 150. Further, the second ball joint 148B is disposed below the plane 150. As shown, both the first 148A and second 148B ball joints, as well as the link 140, are disposed below the plane 150.

In one embodiment, the emitter 136 is further defined as a magnet and the detector 138 is responsive to predetermined changes in magnetic fields generated by the magnet to determine the position of the emitter 136 along the fixed path 140. To that end, the detector 138 may be of any suitable type sufficient to sense and respond to changes in magnetic fields. Moreover, it is conceivable that the emitter 136 could be manufactured from an iron-based material and the detector 138 could be a hall-effect sensor that generates a magnetic field and is capable of responding to changes in the field due to interaction of the iron-based material of the emitter 136.

In one embodiment, the emitter 136 is further defined as a first emitter 136A, the detector 138 is further defined as a first detector 138A, the fixed path 142 is further defined as a first fixed path 142A, the link 140 is further defined as a first link 140A, and the shifter assembly 30 further includes another sensing arrangement. The additional sensing arrangement includes a second emitter 136B spaced from the shift lever 34 and movable along a second fixed path 142B, a second detector 138B coupled to the housing 32 for determining a position of the second emitter 136B along the second fixed path 142B, and a second link 140B. The second link 140B has opposing first and second ends 152, 154 with the second link 140B coupled to the shift lever 34 adjacent the first end 152. The second emitter 136B is coupled to the second link 140B adjacent the second end 154 such that selected movement of the shift lever 34 causes corresponding movement of the second emitter 136B along the second fixed path 142B and the second detector 138B determines a position of the second emitter 136B along the second fixed path 142B. The second fixed path 142B has a substantially arcuate profile (compare FIGS. 10-12). The second link 140B is mounted to the shift lever 34 at a position spaced from the attachment of the first link 140A to the shift lever 34. More specifically, the second link 140B is mounted to the shift lever 34 at a position that is radially spaced from the attachment of the first link 140A to the shift lever 34.

In one embodiment, the shifter assembly 30 further includes an arm 156 pivotally mounted to the housing 42, specifically to the lower of the housing inner elements 52A, with the second emitter 136B supported by the arm 156 and the second end 154 of the second link 140B coupled to the arm 156 so as to move the arm 156, and the second emitter 136B, relative to the shift lever 34 during the selected movement of the shift lever 34. To that end, the arm 156 defines a slot 158 with the second end 154 of the second link 140B disposed within the slot 158 and moveable within the slot 158 when the shift lever 34 moves within the first and second gates 36, 40. The arm 156 includes a first arm end 160 pivotally mounted to the housing 32, as discussed above, and a second arm end 162 supporting the second emitter 136B adjacent thereto, with the slot 158 disposed between the first arm end 160 and the second arm end 162 of the arm 156.

The first detector 138A recognizes a change in position of the first emitter 138A only when the shift lever 34 moves in one of the first and second gates 36, 40, and the second detector 138B recognizes a change in position of the second emitter 138B only during the selected movement of the shift lever 34 along the bridge gate 44.

Figure 6A:
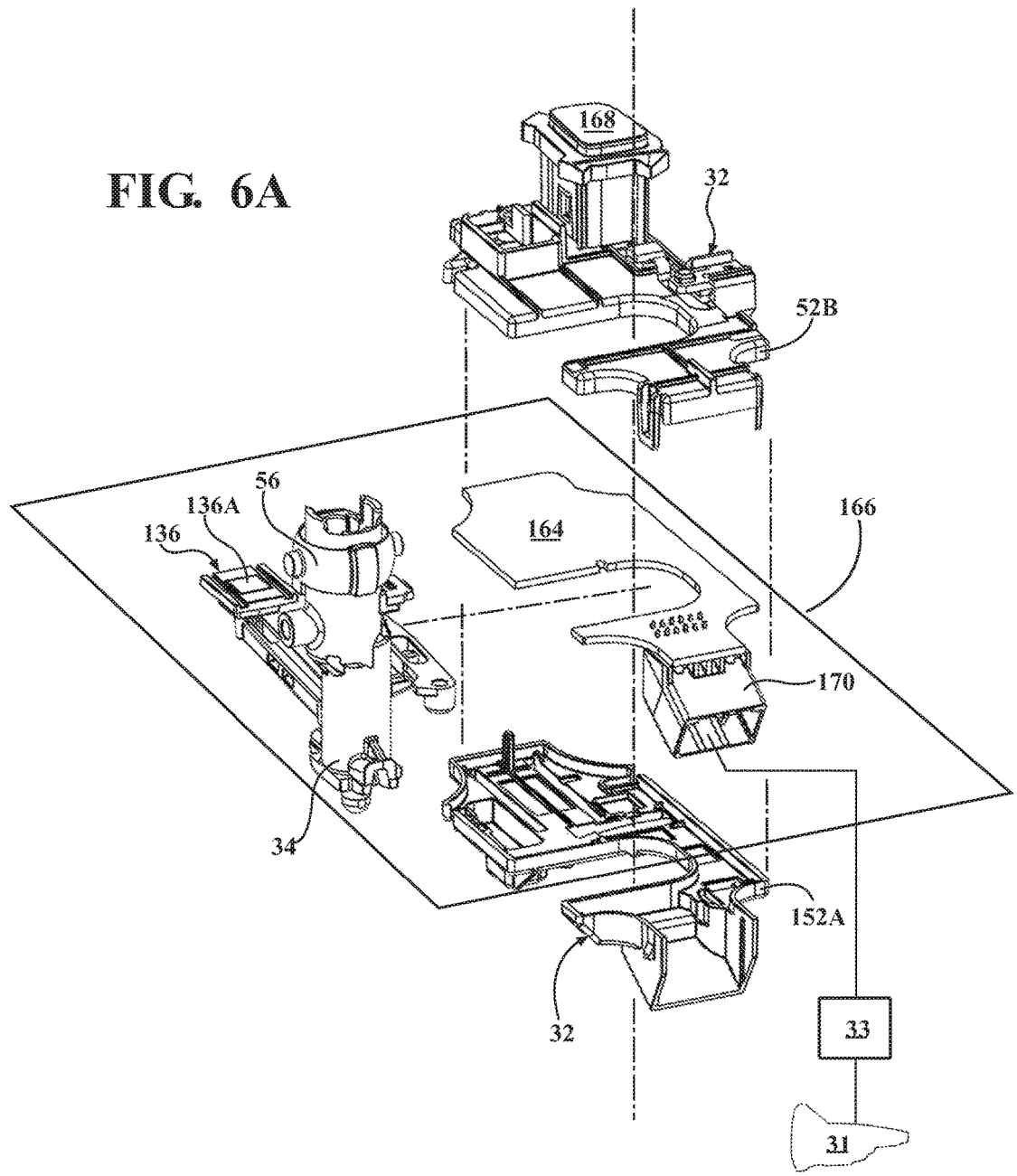
FIG. 6A is an exploded perspective view of the shifter subassembly and housing inner elements of FIGS. 4 and 5, showing a circuit board supported in the housing inner elements.
Figure 6B:
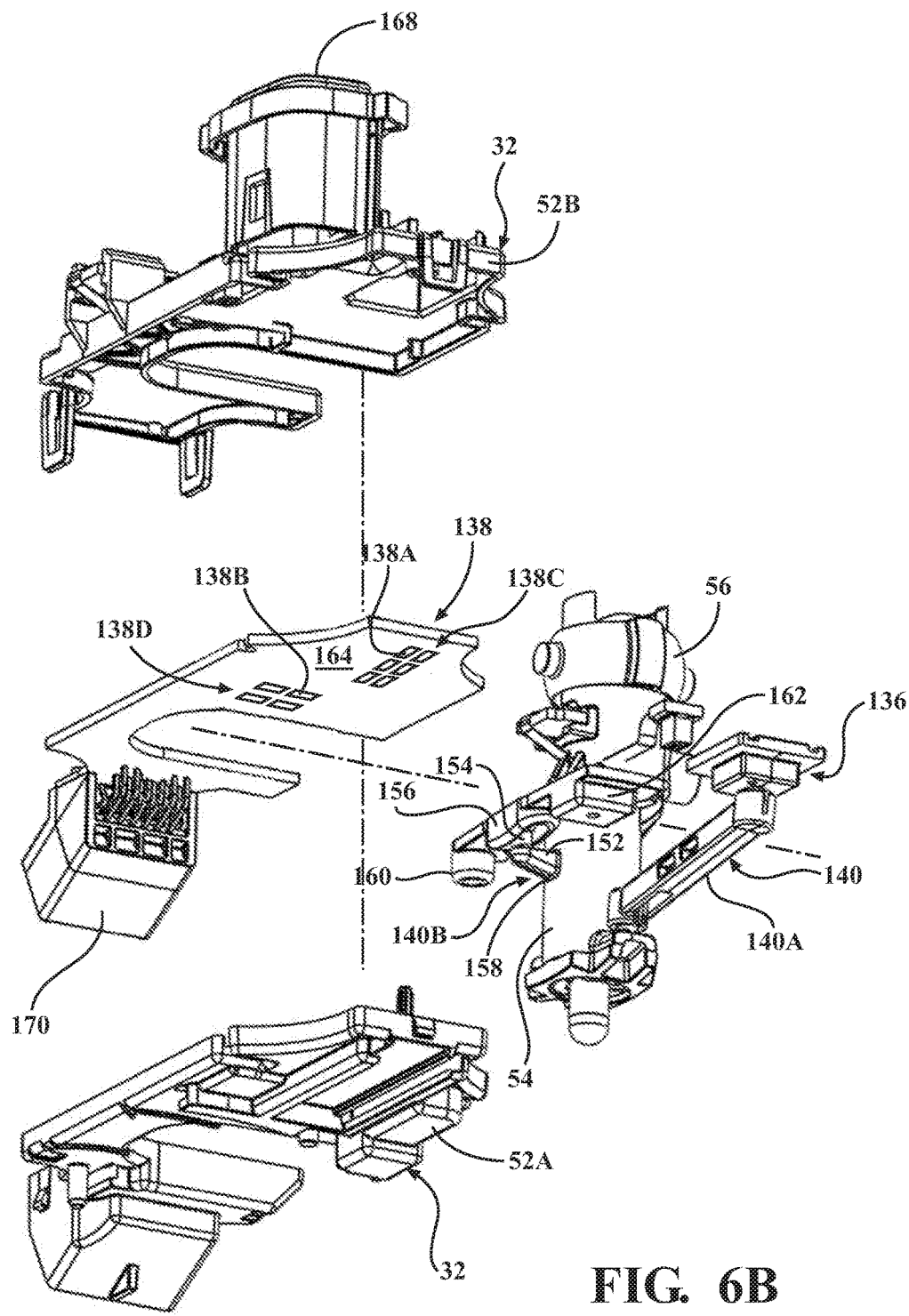
FIG. 6B is another exploded perspective view of FIG. 6A.

Referring now to FIGS. 6A and 6B, the shifter assembly 30 includes a circuit board 164 operatively attached to the housing, specifically disposed between the housing inner elements 52A, 52B, with the detector 138A being mounted to the circuit board 164 and the circuit board 164 defining a board plane 166 with the shift lever 34 extending through the board plane 166. The circuit board 164 shown in FIGS. 6A and 6B is a printed circuit board with additional major components and electrical traces omitted for clarity. However, those having ordinary skill in the art will appreciate that the circuit board 164 may include other components, traces, sensors, and the like, without departing from the scope of the present invention. Moreover, it is conceivable that the shifter assembly 30 may include other features, switches, buttons, or components that are operatively attached to and in electrical communication with the circuit board 164. By way of non-limiting example, the shifter assembly 30 may include a parking brake button 168 in communication with the circuit board 164, and/or an electrical connector 170 used to connect the circuit board 164 to the electronic control unit or module 33 through a wire harness (not shown, but generally known in the art), as discussed above.

The circuit board 164 defines a notch 172 to accommodate movement of the shift lever 34 within the notch 172 without engaging the circuit board 164. It will be appreciated that this configuration optimizes packaging space of the shifter assembly 30 and facilitates simple assembly of the housing 32, as noted above. As shown in FIG. 6B, the detector 138, specifically both detectors 138A, 138B, are disposed between the board plane 166 and the link 140. Moreover, both detectors 138A, 138B may each be defined by a plurality of discrete detector components 138C, 137D that are disposed adjacent to one of the respective fixed paths 142A, 142B.

In operation, the driver can actuate the shift knob 46 which, in turn, moves the shift lever 34. The shift lever 34 can move between the stable positions 106, 108 to change between operating the transmission 31 in the automatic shifting mode and the "sport" manual shifting mode, whereby movement of the shift lever 34 along the bridge gate 44 between the stable positions 106, 108 is causes corresponding movement of the second emitter 136B which, in turn, the second detector 138B senses and can generate a signal that can be used by the electric control module 33 to differentiate between the shifting modes. Further, in either of the shifting modes, movement along any of the shift paths 38A, 38B, 42A, 42B toward any of the unstable positions 110A, 110B, 112A, 112B causes corresponding movement of the first emitter 136A which, in turn, the first detector 138A senses and can generate a signal that can be used by the electric control module 33 to differentiate between shift selections. Thus, the movement of the first emitter 136A can be used to determine a desired change between gear sets, as well to determine a desired change between operating modes.

In this way, the shifter assembly 30 of the present invention provides improved functionality, usability, and ergonomics in connection with conventional automatic transmission systems and, at the same time, reduces the cost and complexity of manufacturing and assembling shifter assemblies 30.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A shifter assembly for changing gears in a vehicle transmission, said shifter assembly comprising:
   a housing;
   a shift lever pivotally mounted to said housing and movable in a first gate along a first plurality of shift paths, a second gate along a second plurality of shift paths, and a bridge gate between said first and second gates with said gates being different from each other;
   a first pivot mechanism mounted to said shift lever to permit movement of said shift lever relative to said housing about a first pivot axis within one of said gates;
   a gimbal ring having an outer surface and an inner surface defining an aperture with said gimbal ring disposed about and coupled to said shift lever with said shift lever extending through said aperture; and
   a second pivot mechanism mounted to said gimbal ring to permit movement of said shift lever relative to said housing about a second pivot axis within another one of said gates, said second pivot axis being spaced from said first pivot axis;
   said gimbal ring having a pair of pivot receivers recessed from said inner surface and spaced from said outer surface with each of said pivot receivers closed from said outer surface of said gimbal ring and having a receiver bearing surface, with said first pivot mechanism of said shift lever engaging each of said pivot receivers to pivotally couple said shift lever to said gimbal ring and said first pivot mechanism cooperating with said receiver bearing surfaces to allow movement of said shift lever about said first pivot axis;
   wherein each of said pivot receivers of said gimbal ring has a pair of receiver walls extending from said receiver bearing surface to define an open slot.

2. The shifter assembly as set forth in claim 1, wherein said first pivot axis is substantially perpendicular to said second pivot axis.

3. The shifter assembly as set forth in claim 1, wherein said gimbal ring pivots in unison with said shift lever during said pivoting of said shift lever about said second pivot axis.

4. The shifter assembly as set forth in claim 1, wherein said second pivot mechanism includes a pair of bores defined in said housing and a pair of opposing protrusions extending from said outer surface of said gimbal ring.

5. The shifter assembly as set forth in claim 4, wherein said protrusions are separated from each other and spaced from said aperture of said gimbal ring.

6. The shifter assembly as set forth in claim 4, wherein said housing is formed from at least two housing elements that cooperate to pivotally support said gimbal ring with one of said bores of said second pivot mechanism defined in each of said housing elements.

7. The shifter assembly as set forth in claim 6, wherein each of said housing elements include an arcuate receiver disposed adjacent said bore of said second pivot mechanism having a configuration complementary to said outer surface of said gimbal ring for accommodating said gimbal ring.

8. The shifter assembly as set forth in claim 1, said inner surface of said gimbal ring defines a first perimeter and said shift lever has an outer surface adjacent said first pivot mechanism defining a second perimeter with said first perimeter being larger than said second perimeter to permit relative movement between said shift lever and said gimbal ring when said shift lever moves in at least one of said gates.

9. The shifter assembly as set forth in claim 1, wherein said first pivot mechanism includes a pair of opposing pivot keys separately mounted to said shift lever and each extending outwardly from said shift lever.

10. The shifter assembly as set forth in claim 1, wherein said first pivot mechanism includes a pair of opposing pivot keys each having a key bearing surface with said key bearing surfaces cooperating with said receiver bearing surfaces to facilitate said movement of said shift lever about said first pivot axis.

11. The shifter assembly as set forth in claim 10, wherein said key bearing surface and said receiver bearing surface each have a tapered profile.

12. The shifter assembly as set forth in claim 10, wherein each of said pivot keys of said shift lever have a pair of key walls depending from said key bearing surface and each of said pivot receivers of said gimbal ring have a pair of receiver walls that cooperate with said key walls to limit movement of said shift lever about said first pivot axis.

13. The shifter assembly as set forth in claim 12, wherein said key walls of said pivot keys define a first angle therebetween and said receiver walls of said pivot receivers define a second angle therebetween with said second angle being larger than said first angle.

14. The shifter assembly as set forth in claim 10, wherein said pivot keys have an axial lock spaced from said key bearing surface and said pivot receivers have an axial lock receiver spaced from said receiver bearing surface with said axial lock cooperating with said axial lock receiver to at least partially limit axial translation of said shift lever with respect to said gimbal ring.

15. The shifter assembly as set forth in claim 14, wherein said axial lock of said pivot key is further defined as a tooth, and said axial lock receiver of said pivot receiver is further defined as a notch for engaging said tooth.

16. The shifter assembly as set forth in claim 1, wherein said bridge gate is substantially perpendicular to at least one of said first gate and said second gate.

17. The shifter assembly as set forth in claim 1, wherein a first stable position is defined where said bridge gate intersects said first gate, and a second stable position is defined where said bridge gate intersects said second gate, and wherein said shift lever is biased:
- toward said first stable position when said shift lever moves along said first plurality of shift paths, and
- toward said second stable position when said shift lever moves along said second plurality of shift paths.

18. The shifter assembly as set forth in claim 17, wherein said first plurality of shift paths includes a first pair of unstable positions spaced from said first stable position, said second plurality of shift paths includes a second pair of unstable positions spaced from said second stable position, and wherein said shift lever is biased:
- away from each of said first pair of unstable positions toward said first stable position when said shift lever moves in said first gate, and
- away from each of said second pair of unstable positions toward said second stable position when said shift lever moves in said second gate.

19. The shifter assembly as set forth in claim 17, wherein said shift lever is biased along said bridge gate toward said first stable position when said shift lever is closer to said first stable position than to said second stable position.

20. The shifter assembly as set forth in claim 17, further including a detent mechanism disposed between said shift lever and said housing for biasing said shift lever along said bridge gate between said first stable position and said second stable position.

21. The shifter assembly as set forth in claim 20, wherein said detent mechanism includes a spring-biased plunger coupled to said shift lever, and first and second receivers defined in said housing with said plunger engaging said first receiver when said shift lever is in said first gate and engaging said second receiver when said shift lever is in said second gate.

22. The shifter assembly as set forth in claim 21, wherein said spring-biased plunger is adapted to axially bias said shift lever with respect to said second pivot mechanism.

23. The shifter assembly as set forth in claim 21, wherein said second pivot mechanism includes a pair of sockets defined in said housing and a pair of opposing protrusions extending from said outer surface of said gimbal ring, each of said sockets having inclined walls with said spring-biased plunger urging said protrusions of said gimbal ring against said walls of said sockets.

24. The shifter assembly as set forth in claim 1, wherein said shift lever has an inner surface defining an inner chamber, said inner chamber being at least partially disposed adjacent to said first pivot mechanism.

25. A shifter assembly for changing gears in a vehicle transmission, said shifter assembly comprising:
- a housing;
- a shift lever pivotally mounted to said housing and movable in a first gate along a first plurality of shift paths, a second gate along a second plurality of shift paths, and a bridge gate between said first and second gates with said gates being different from each other;
- a first pivot mechanism mounted to said shift lever to permit movement of said shift lever relative to said housing about a first pivot axis within one of said gates;
- a gimbal ring having an outer surface and an inner surface defining an aperture with said gimbal ring disposed about and coupled to said shift lever with said shift lever extending through said aperture; and
- a second pivot mechanism mounted to said gimbal ring to permit movement of said shift lever relative to said housing about a second pivot axis within another one of said gates, said second pivot axis being spaced from said first pivot axis;
- said gimbal ring having a pair of pivot receivers recessed from said inner surface and spaced from said outer surface with each of said pivot receivers closed from said outer surface of said gimbal ring and having a receiver bearing surface, with said first pivot mechanism of said shift lever engaging each of said pivot receivers to pivotally couple said shift lever to said gimbal ring and said first pivot mechanism cooperating with said receiver bearing surfaces to allow movement of said shift lever about said first pivot axis;
- wherein said first pivot mechanism includes a pair of opposing pivot keys each having a key bearing surface with said key bearing surfaces cooperating with said receiver bearing surfaces to facilitate said movement of said shift lever about said first pivot axis; and
- wherein said key bearing surface and said receiver bearing surface each have a tapered profile.

* * * * *